United States Patent
Zumstein et al.

(10) Patent No.: US 9,450,475 B2
(45) Date of Patent: Sep. 20, 2016

(54) METHODS AND APPARATUS FOR A MOTOR

(71) Applicant: Verde Smart Motors, Scottsdale, AZ (US)

(72) Inventors: Jared D. Zumstein, Fort Wayne, IN (US); Stephen A. Zavodny, Fort Wayne, IN (US); Luis D. Morales, Fort Wayne, IN (US); Barry M. Benson, Fort Wayne, IN (US)

(73) Assignee: Verde Smart Motors, Inc., Scottsdale, AZ (US)

( * ) Notice: Subject to any disclaimer, the term of this patent is extended or adjusted under 35 U.S.C. 154(b) by 0 days.

(21) Appl. No.: 14/070,123

(22) Filed: Nov. 1, 2013

(65) Prior Publication Data

US 2015/0130386 A1 May 14, 2015

Related U.S. Application Data

(60) Provisional application No. 61/721,444, filed on Nov. 1, 2012.

(51) Int. Cl.

| | |
|---|---|
| *H02K 9/22* | (2006.01) |
| *H02K 9/04* | (2006.01) |
| *H02K 11/00* | (2016.01) |
| *H02K 5/10* | (2006.01) |
| *H02K 5/18* | (2006.01) |
| *H02K 5/20* | (2006.01) |
| *H02K 9/14* | (2006.01) |

(52) U.S. Cl.
CPC .............. *H02K 11/0073* (2013.01); *H02K 5/10* (2013.01); *H02K 5/18* (2013.01); *H02K 5/20* (2013.01); *H02K 9/14* (2013.01); *H02K 11/0094* (2013.01); *H02K 11/33* (2016.01); *H02K 9/04* (2013.01); *H02K 2213/03* (2013.01)

(58) Field of Classification Search
USPC .................................................. 310/63, 68 R
See application file for complete search history.

(56) References Cited

U.S. PATENT DOCUMENTS

| | | | | |
|---|---|---|---|---|
| 5,574,321 | A * | 11/1996 | Baker ..................... | F04D 25/08 310/179 |
| 6,700,235 | B1 * | 3/2004 | McAfee .................. | H02K 9/06 310/52 |
| 8,820,286 | B2 * | 9/2014 | Cole ..................... | H02K 1/2786 123/179.28 |
| 9,087,631 | B2 * | 7/2015 | Horiuchi ................ | C22C 19/07 |
| 2007/0273221 | A1 * | 11/2007 | Kinoshita ............... | H02K 3/50 310/58 |
| 2009/0102314 | A1 * | 4/2009 | Miyata .................. | H02K 1/243 310/257 |

* cited by examiner

*Primary Examiner* — Paul Ip
*Assistant Examiner* — Said Bouziane
(74) *Attorney, Agent, or Firm* — The Noblitt Group, PLLC

(57) ABSTRACT

Methods and apparatus for a motor generally comprise a motor shell, a drive unit, a motor electronics assembly configured to operate the drive unit, and a shaft coupled to the drive unit. The drive unit may comprise an axial design configured to increase the efficiency of the system. The motor may be totally enclosed, the shaft may be sealed using a labyrinth seal, and the motor electronics assembly may be contained within the motor shell. The motor may comprise shapes and materials to promote cooling by air flow and thermal conduction. The motor may further comprise a touch-sensitive interface, may operate at high speed in response to a signal, and may provide a single location for the connection of all inputs. A motor according to the present invention may have improved operating characteristics.

30 Claims, 17 Drawing Sheets

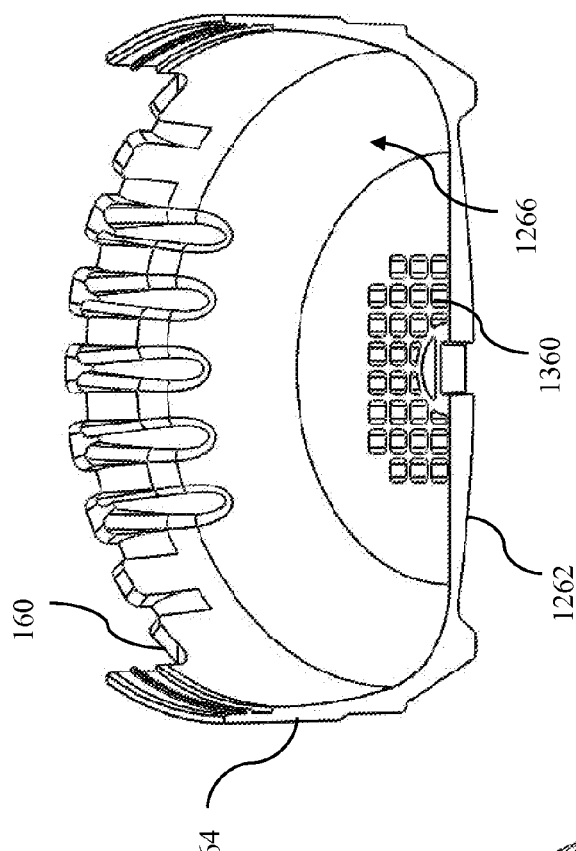
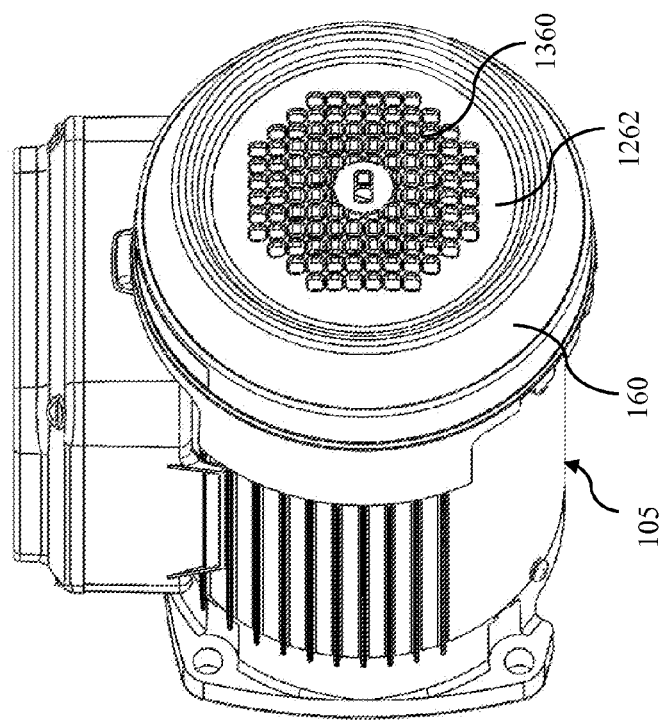
Figure 13B
Figure 13A

METHODS AND APPARATUS FOR A MOTOR

CROSS-REFERENCES TO RELATED APPLICATIONS

This application claims the benefit of U.S. Provisional Patent Application No. 61/721,444, filed Nov. 1, 2012, titled METHODS AND APPARATUS FOR A MOTOR, and incorporates its disclosure by reference.

BACKGROUND OF THE INVENTION

Residential aquatic pumping environments require a motor to operate in a wide range of temperatures to sufficiently power a pump, and require the motor to meet certain size restrictions, such as being 6.5 inches in diameter or less. Conventional motors used in residential aquatic pumping environments are typically implemented using a radial electromagnetic design, where the rotor resides within the stator and the magnetic flux propagates radially between the outside surface of the rotor and the inside surface of the stator. The electronic circuits for a conventional motor are typically contained in an over-the-motor housing, and electrical power and signals are typically coupled directly to motor drive circuit boards, leading to disorganized connections at various locations on the motor. In addition, conventional motors are typically designed with perpendicular, angular, or small radial surfaces, and conventional motor fans are designed with flat or straight blades attached to a perpendicular baffle, causing air flow to make abrupt turns and leading to noise and inefficiency.

Conventional motors also typically use pushbuttons for a user interface, which eventually fail due to weather- and chemical-related degradation of the mechanical pushbutton and/or the sealing technology employed. Similarly, motor shafts are typically sealed using either a spring-loaded lip seal or a thin rubber washer, which fail due to the degradation of the seal material as it is exposed to chemicals, such as caustic cleansing chemicals used in clean water aquatic applications.

SUMMARY OF THE INVENTION

Methods and apparatus for a motor generally comprise a motor shell, a drive unit, a motor electronics assembly configured to operate the drive unit, and a shaft coupled to the drive unit. The drive unit may comprise an axial design configured to increase the efficiency of the system. The motor may be totally enclosed, the shaft may be sealed using a labyrinth seal, and the motor electronics assembly may be contained within the motor shell. The motor may comprise shapes and materials to promote cooling by air flow and thermal conduction. The motor may further comprise a touch-sensitive interface, may operate at high speed in response to a signal, and may provide a single location for the connection of all inputs. A motor according to the present invention may have improved operating characteristics.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

FIG. 13A is a perspective view of the fan guard coupled to the motor shell in accordance with an exemplary embodiment of the present invention;

FIG. 13B is a cut-away perspective view of the inside of the fan guard in accordance with an exemplary embodiment of the present invention;

DETAILED DESCRIPTION OF EXEMPLARY EMBODIMENTS

Various aspects of present invention may be described in terms of functional block components and various processing steps. Such functional blocks may be realized by any number of components configured to perform the specified functions and achieve the various results. For example, implementations of the present invention may employ systems, technologies, devices, designs, and the like, which may carry out a variety of functions. In addition, various aspects of the present invention may be practiced in conjunction with various motors, generators, and/or other electrical systems and components, or any relevant device for controlling, providing power to, or otherwise using motors, generators, and/or other suitable electromagnetic or electromechanical components, and the systems described are merely exemplary applications. Various aspects of the present invention may also involve multiple parts and functions.

Methods and apparatus for a motor according to various aspects of the present invention may operate in conjunction with any suitable motor system. For example, various representative implementations of the present invention may be applied to pool, spa, and/or HVAC systems.

Figure 1:
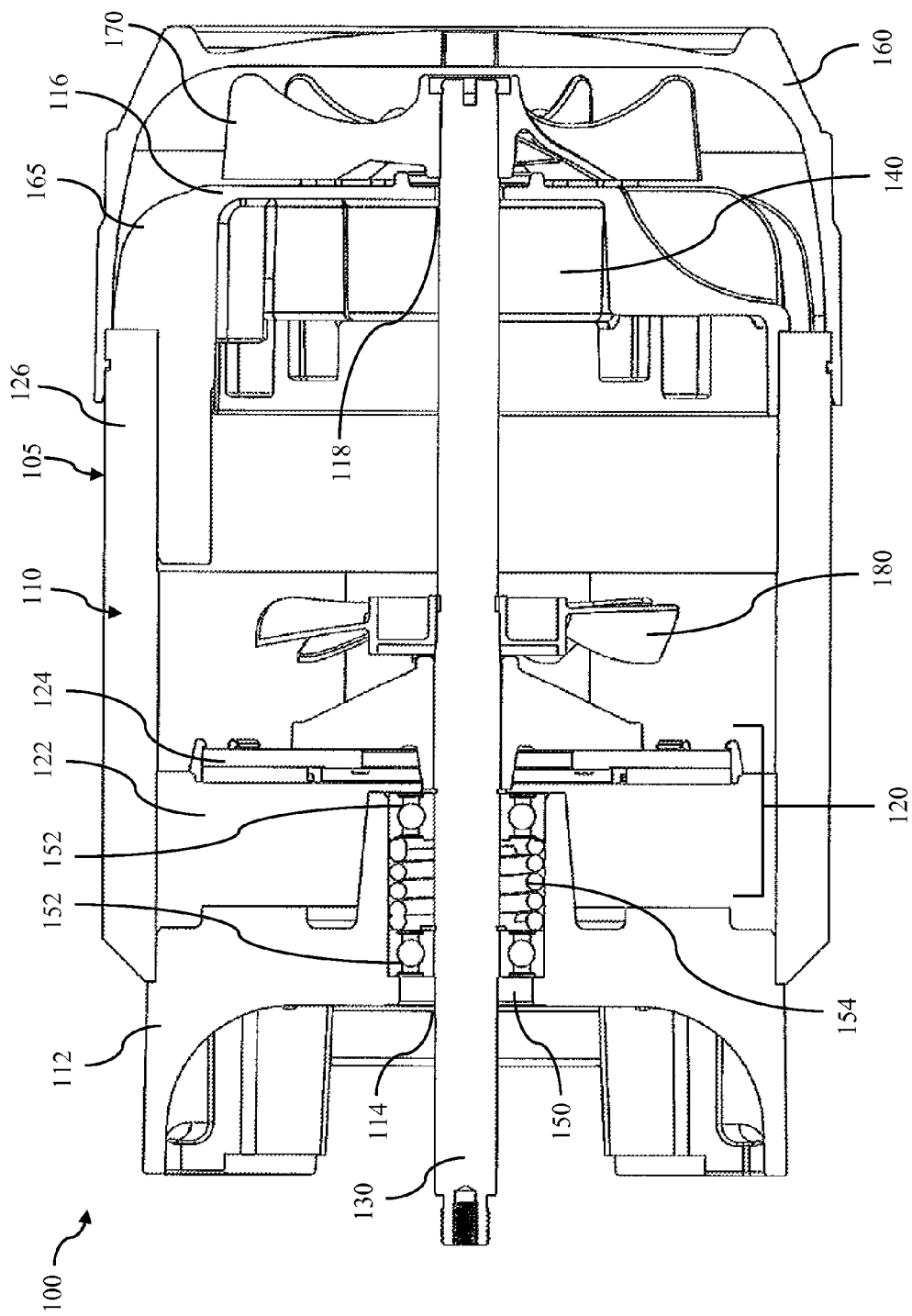
FIG. 1 is a cross section of an exemplary motor in accordance with an exemplary embodiment of the present invention.

Referring now to FIG. 1, in one embodiment, methods and apparatus for a motor 100 may comprise a motor shell 105, a drive unit 120 disposed within an interior volume of the motor shell 105 and coupled to a shaft 130, and a motor electronics assembly 140 electronically coupled with the drive unit 120. The motor shell 105 may comprise a first end 112 and a second end 116, a sidewall portion 110 extending between the first and second ends to form the interior volume between the first and second ends. The motor shell 105 may comprise any suitable material for providing support for the various components of the motor 100, and may facilitate thermal conduction between the interior and the exterior of the motor 100. The motor shell 105 may comprise a rigid material such as die cast aluminum.

The shaft 130 may extend outward from the interior of the motor shell 105 through a first hole 114 in the first end 112 of the motor shell 105. The first end 112 may comprise any suitable system or method for mounting to a motor driven device such as a pump. For example, the first end 112 may comprise a square mounting flange, a C-Face mount, and the like suitably configured to securely couple the motor 100 to the pump. The pump may comprise an aquatic pump. The motor electronics assembly 140 may be configured to control the drive unit 120 which may be configured to rotate about a longitudinal axis of the shaft 130 during operation.

The shaft 130 may extend through a second hole 118 disposed at the second end 116 of the motor shell 105. A first fan assembly 170 may be coupled to the shaft 130 and configured to provide an air flow over an exterior surface of the motor shell 105. A fan guard 160 may be coupled to the motor shell 105 and may be configured to protect the first fan assembly 170 and/or provide protection from the first fan assembly 170. For example, the fan guard 160 may be configured to cover the first fan assembly 170. A second fan assembly 180 may be coupled to the shaft 130 and may be configured to provide air flow on the interior of the motor shell 105. The second fan assembly 180 may comprise any suitable system or method for providing a movement of air internal to the motor shell 105.

The shaft 130 may comprise any suitable material for being rotated about its longitudinal axis by the drive unit, and may be any suitable shape. In one embodiment, the shaft 130 may comprise a single continuous material. For example, the shaft 130 may comprise a substantially cylindrical body formed from a metal such as steel, aluminum, and the like. In an alternative embodiment, the shaft 130 may comprise more than one separate segment and/or material. The motor 100 may further comprise one or more bushings and/or bearings 152 located in the interior portion of the motor 100 and configured to provide support for the shaft 130, and a spring 154 configured to provide support for the one or more bushing and/or bearings 152. For example, the spring 154 may preload the bushings and/or bearing 152 by opposing the direction of a magnetic force between a rotor 124 and a stator 122.

The first end 112 of the motor 100 may comprise a shaft seal 150 configured to seal the first hole 114. The shaft seal 150 may comprise any suitable device or system for sealing an interior portion of the motor 100 from an exterior portion of the motor 100. For example, the shaft seal 150 may comprise a sealing system suitably configured to prevent air and/or moisture from migrating along the shaft 130 and into the one or more bushings and/or bearings 152. In one embodiment, the shaft seal 150 may comprise a labyrinth seal suitably adapted to seal the first hole 114 and reduce the likelihood of water intrusion and/or leakage of any bearing lubricant. The shaft seal 150 may comprise a wash-down grade seal.

The shaft seal 150 may comprise any suitable material such as metal, plastic, rubber, and/or composite. The shaft seal 150 may comprise a material suitably adapted for continued or prolonged exposure to materials and/or chemicals commonly found in aquatic environments such as a pool, pond, water treatment plant, and the like. For example, the shaft seal 150 may comprise a polytetrafluoroethylene (PTFE) material suitably configured for exposure to caustic environments without suffering significant and/or performance degradation. In one embodiment, the shaft seal 150 comprises a graphite-filled PTFE. The shaft seal 150 may comprise one or more O-rings made of any similarly suitable material. In one embodiment, the shaft seal 150 comprises a first O-ring to provide a seal with the shaft 130, and a second O-ring to provide a seal with the first hole 140, and the O-rings may comprise a fluorinated elastomer such as FKM.

In one embodiment, various components of the motor 100, such as the motor shell 105 and shaft seal 150, form a totally-enclosed motor. A totally-enclosed motor may prevent dust from entering the motor, and may resist water or other liquids from entering the motor. For example, the motor shell 105 may be additionally sealed and/or designed to reduce a likelihood of air or moisture entering into the inner volume. In some alternative embodiments, the various components of the motor 100 may form an open motor, may form a drip-proof motor, and the like.

The drive unit 120 may comprise any suitable system or method for providing a force to the shaft 130. The motor 100 may be configured to allow the shaft 130 to rotate in response to the force provided by the drive unit 120 to the shaft 130. For example, the one or more bushings and/or bearings 152 may support the shaft 130 and may allow the shaft 130 to rotate about its longitudinal axis. The drive unit 120 may be configured to use any suitable source of energy to generate the force. For example, the drive unit 120 may receive one or more sources of electricity, may generate one or more magnetic fields therefrom, and may rotate in response to the generated magnetic field(s). The drive unit 120 may be configured to use alternating current ("AC") and/or direct current ("DC") to generate the force.

The drive unit may comprise a rotor 124 and a stator 122. The rotor 124 and stator 122 may be arranged in any suitable configuration. For example, the rotor 124 and stator 122 may be arranged in a radial configuration where the rotor 124 and stator 122 are arranged concentrically, for example where the rotor 124 and stator 122 are arranged about the same portion of the axis of rotation of the rotor 124 such that a plane of rotation of the rotor 124 intersects the stator 122. In a radial configuration, a magnetic flux generally propagates radially (with reference to the axis of rotation of the rotor 124) between the rotor 124 and stator 122.

Figure 8:
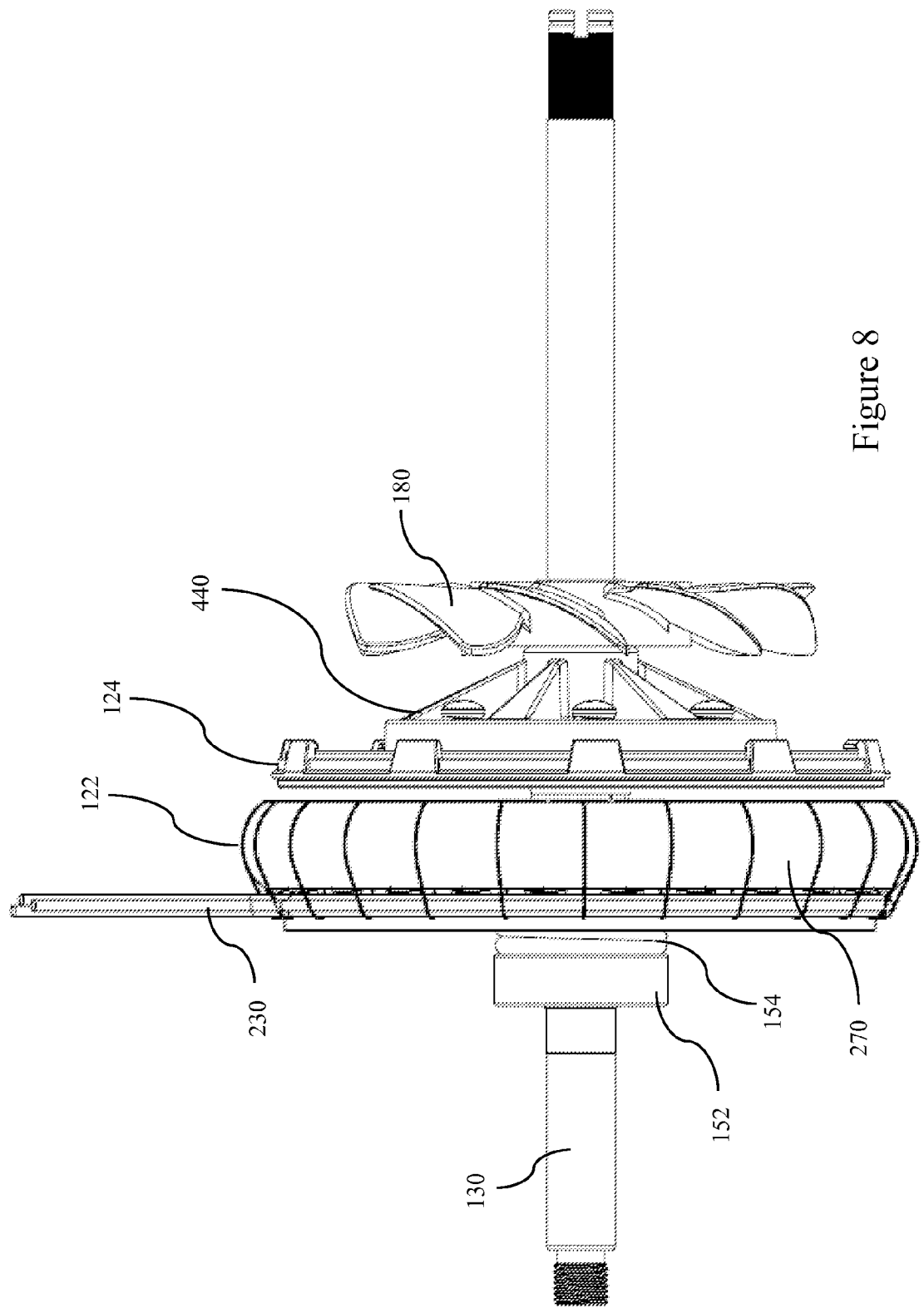
FIG. 8 representatively illustrates a side view of a drive unit arranged about a shaft in accordance with an exemplary embodiment of the present invention.

Referring now to FIGS. 1 and 8, in one embodiment, the rotor 124 and stator 122 are arranged in an axial configuration, where the rotor 124 and stator 122 are generally circular and are arranged about different portions of the axis of rotation of the rotor 124, such that a plane of rotation of the rotor 124 does not intersect the stator 122. In an axial configuration, the magnetic flux generally propagates axially (with reference to the axis of rotation of the rotor 124) between the rotor 124 and stator 122. The axis of rotation of the rotor 124 may comprise the longitudinal axis of the shaft 130. The stator 122 may be mounted to or positioned proximate to the first end 112 of the motor shell 105, and the rotor 124 may be positioned proximate to the stator 122. In one embodiment, the stator 122 is closer to the first end 112 of the motor shell 105. In another embodiment, the rotor 124 is closer to the first end 112 of the motor shell 105. Heat from the stator 122 may be dissipated via thermal conduction through the first end 112 and/or the sidewall portion 110.

Figure 2:
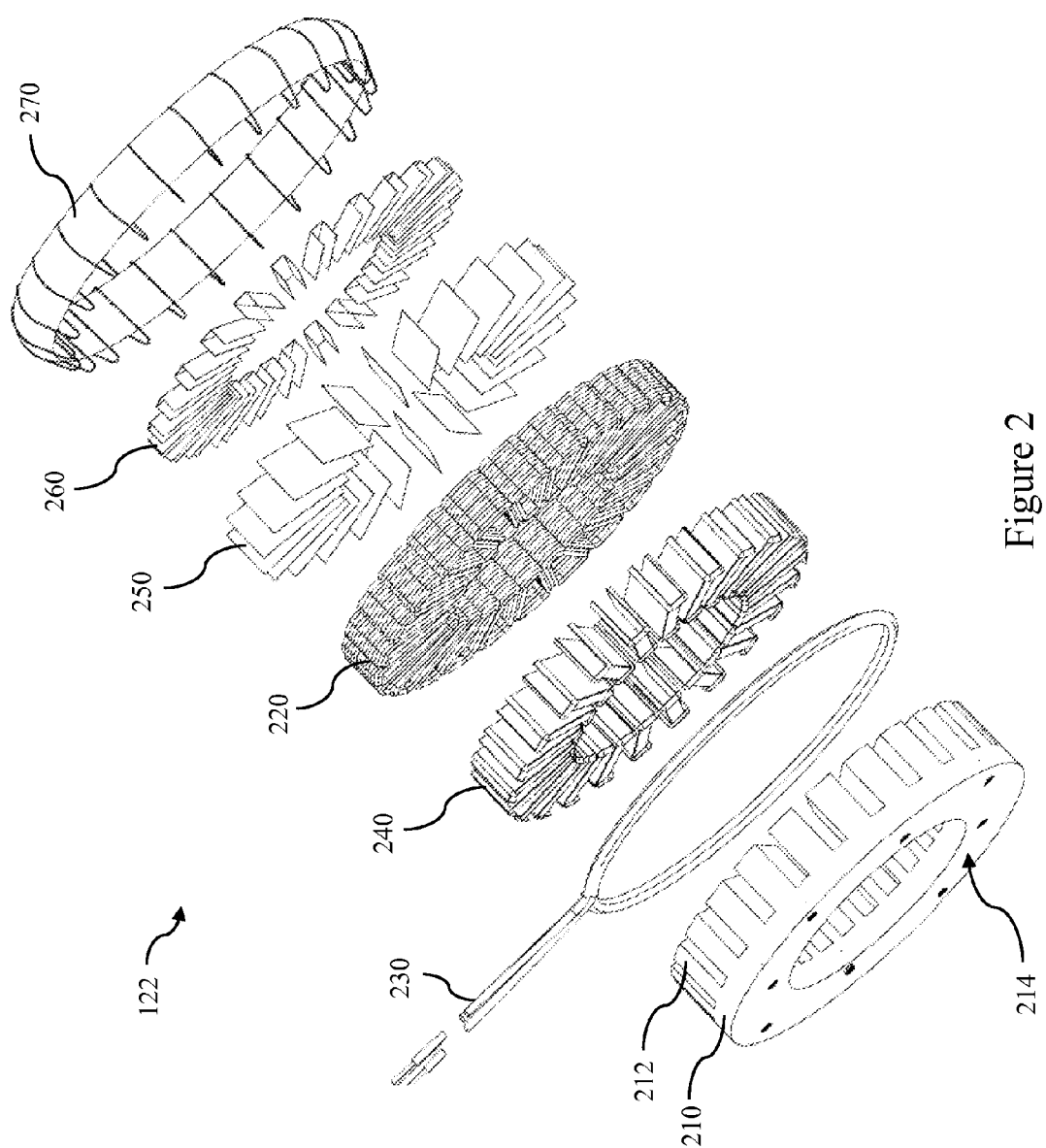
FIG. 2 is an exploded view of a stator assembly in accordance with an exemplary embodiment of the present invention.

Referring now to FIG. 2, the stator 122 may comprise any suitable system or device for providing a magnetic field. The stator 122 may comprise permanent magnets and/or electromagnets. In some embodiments, the stator 122 may comprise one or more electromagnets. For example, the stator 122 may comprise a stator core 210 and one or more electromagnetic coils 220. The stator core 210 may comprise any ferromagnetic material, such as iron, nickel, cobalt, any alloy thereof, and the like. In one embodiment, the stator core 210 comprises non-oriented steel.

Figure 3B:
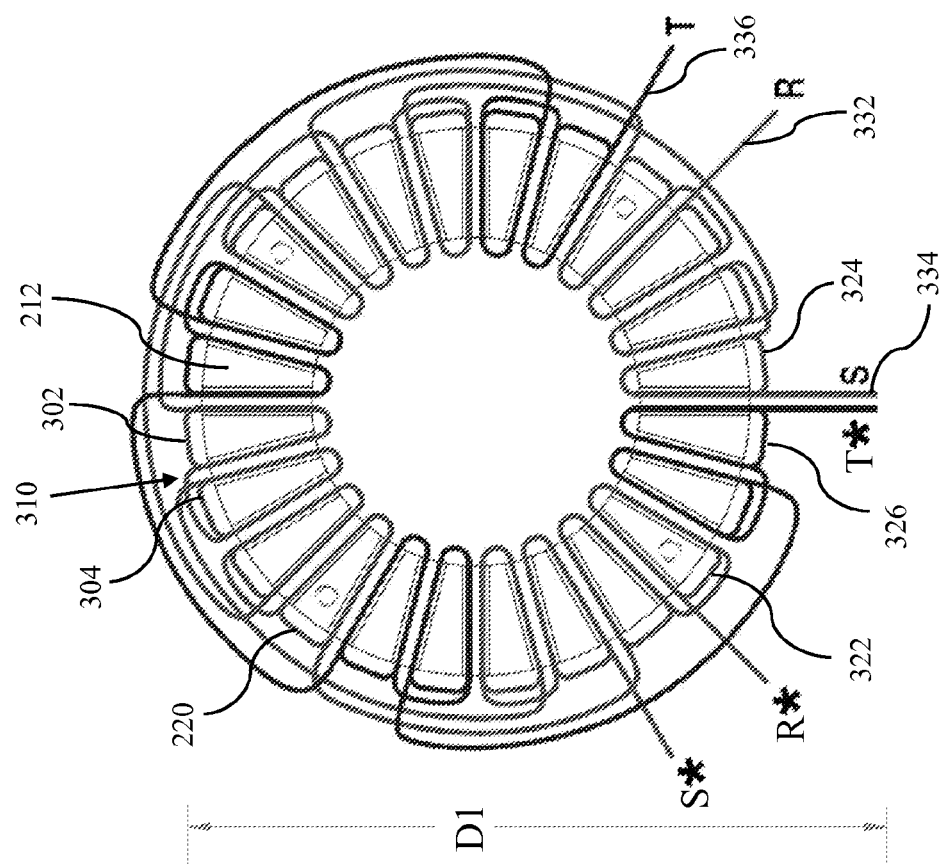
FIG. 3B representatively illustrates stator wiring in accordance with an exemplary embodiment of the present invention.
Figure 3A:
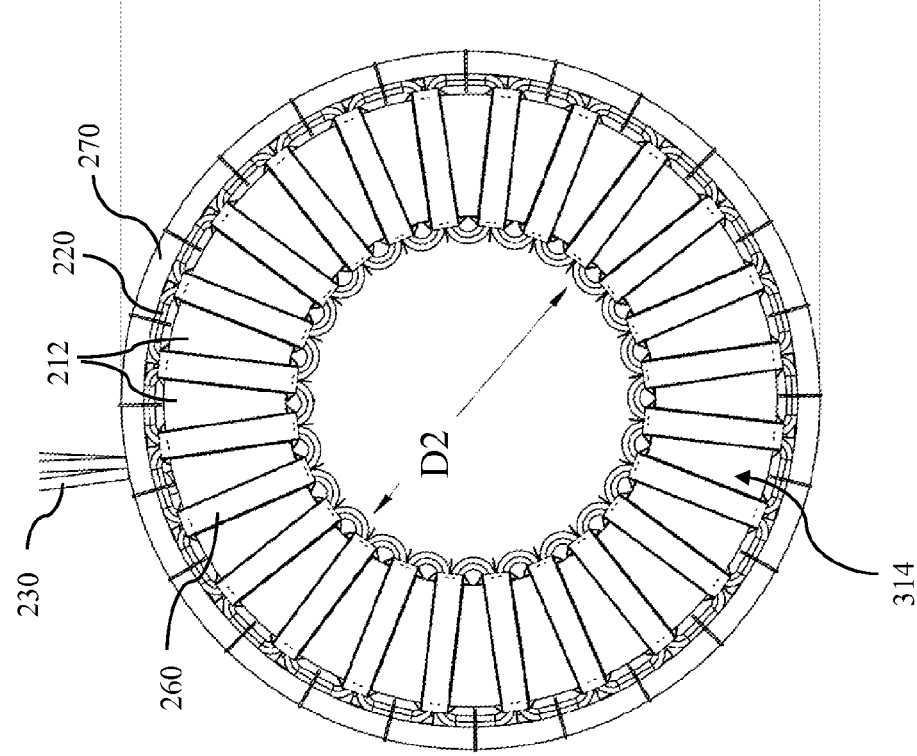
FIG. 3A representatively illustrates a front view of the stator assembly in accordance with an exemplary embodiment of the present invention.

Referring to FIGS. 2 and 3A, the stator 122 may be any suitable shape for providing the magnetic field toward the rotor 124. In one embodiment, the stator core 210 may be annular or approximately annular shaped, being defined by concentric inner and outer circles. The stator core 210 may comprise one or more stator teeth 212. The one or more stator teeth 212 may comprise a first pair of spaced apart sides disposed generally parallel to one another, and a second pair of spaced apart sides that taper inwardly from the outer concentric circle to the inner concentric circle. In one embodiment, the first pair of spaced apart sides may be defined by arcs of the inner and outer concentric circles that define the stator core. In another embodiment, the first pair of spaced apart sides may be defined by straight lines, and may comprise chords of the inner and outer concentric circles that define the stator core. In yet another embodiment, the first pair of spaced apart sides may instead be defined by a second set of concentric circles and may comprise chords and/or arcs defined by the second set of concentric circles. Neighboring stator teeth 212 may define a slot configured to accommodate portions of one or more electromagnetic coils 220. For reference, a stator core rear surface 214 is defined as the surface of the stator core 210 opposite to the one or more stator teeth 212. A stator core facing surface 314 is defined as the surface of the stator core 210 that will face the rotor 124.

Referring now to FIGS. 3A and 3B, a stator tooth 212 may be positioned within an electromagnetic coil 220 to form a ferromagnetic-core electromagnet. In some embodiments, a subset of the stator teeth 212 may not be positioned within the electromagnetic coil 220. In some embodiments, the stator 122 comprises an identical number of stator teeth 212 and electromagnetic coils 220, and each stator tooth 212 may be located within one electromagnetic coil 220. For example, in one embodiment, the stator 122 comprises twenty-four (24) stator teeth 212 and twenty-four (24) electromagnetic coils 220, with each stator tooth 212 positioned within one of the electromagnetic coils 220.

The electromagnetic coil 220 generates a magnetic field when an electric current is applied. The electromagnetic coil 220 may comprise any electrical conductor configured to pass at least once around a central location, such as the stator tooth 212. Each pass of the electrical conductor around the central location is referred to as a winding. The electrical conductor may be insulated to ensure that electrical current passes through each winding of the electrical conductor. The electrical conductor may comprise copper, aluminum, and the like. For example, the electrical conductor may comprise copper wire, and the electromagnetic coil 220 may comprise at least one winding of copper wire. In one embodiment, the electromagnetic coil 220 comprise 32 (thirty-two) windings, and the windings may comprise 1.0 mm to 1.2 mm (18 to 16 AWG) gauge copper wire. The stator 122 may comprise one or more phase conductors 230 capable of transmitting an electric current to the one or more electromagnetic coils 220. For example, the phase conductor 230 may comprise a copper wire.

Referring now to FIG. 3B, the stator 122 may comprise one or more groups of electromagnetic coils 220 electrically coupled together in any suitable configuration. Each group of electrically coupled electromagnetic coils 220 may be referred to as a coil group. For example, a first coil group 322 may comprise eight electromagnetic coils 220 electrically coupled in series between a first phase conductor 332 and the reference location "R*". As used herein, items that are electrically coupled with each other may comprise distinct electrical conductors, or may comprise the same physically-continuous electrical conductor. For example, two electromagnetic coils 220 electrically coupled together may comprise distinct electromagnetic coils 220 connected by one or more separate conductors such as solder, a wire, and the like, or may comprise a single wire first wound to create a first electromagnetic coil 220, and then wound to create a second electromagnetic coil 220. The phase conductor 230 may be electrically coupled with a coil group to transmit an electric current to each electromagnetic coil 220 in the coil group.

Each coil group may comprise one or more pairs of electromagnetic coils 220, which may be referred to as a coil pair 310. Each electromagnetic coil 220 in a coil pair 310 may be configured to conduct an electric current in an opposite direction than the other electromagnetic coil 220 in the coil pair 310 is configured to conduct the electric current. For example, if a first electromagnetic coil 302 in a coil pair 310 is wound clockwise around a first stator tooth 212, a second electromagnetic coil 304 in the coil pair 310 may be wound counterclockwise around a second stator tooth 212. Each electromagnetic coil 220 in a coil pair may be next to the other electromagnetic coil 220 in the coil pair, and each coil pair may be separated from other coil pairs in the same coil group by one or more coil pairs belonging to a different coil group.

In one embodiment, referring again to FIG. 3B, the stator 122 comprises a first coil group 322, a second coil group 324, and a third coil group 326. The stator further comprises a first phase conductor 332 electrically coupled with the first coil group 322, a second phase conductor 334 electrically coupled with the second coil group 324, and a third phase conductor 336 electrically coupled with the third coil group 326. The first coil group 322 may comprise eight electromagnetic coils 220 electrically coupled in series between the first phase conductor 332 and the reference location "R*". The second coil group 324 may comprise eight electromagnetic coils 220 electrically coupled in series between the second phase conductor 334 and the reference location "S*". The third coil group 326 may comprise eight electromagnetic coils 220 electrically coupled in series between the third phase conductor 336 and the reference location "T*".

The first coil group 322, second coil group 324, and third coil group 326 may each comprise four coil pairs 310. The electromagnetic coils 220 in each coil pair 310 may be electrically coupled in series, and may be configured to conduct an electric current in opposite directions to create magnetic fields of opposite polarity. For example, an electric current passing from the reference location "R" on the first phase conductor 332 to the reference location "R*" may pass counterclockwise through a first electromagnetic coil 220 of a coil pair 310 and may pass clockwise through a second electromagnetic coil 220 of the same coil pair.

Still referring to FIG. 3B, the coil pairs in each coil group 322, 324, 326 may be electrically coupled in series. Further, each coil pair in a coil group 322, 324, 326 may be configured to conduct an electric current in an opposite set of directions compared to the previous and/or next coil pair in the coil group. For example, an electric current passing from the reference location "R" on the first phase conductor 332 to the reference location "R*" may pass counterclockwise through a first electromagnetic coil 220 of a first coil pair and then clockwise through a second electromagnetic coil 220 of the first coil pair, and then may pass clockwise through a first electromagnetic coil 220 of a second coil pair and then counterclockwise through a second electromagnetic coil 220 of the second coil pair.

In one embodiment, the phase conductors 332, 334, 336 may transmit alternating currents having the same frequency that are offset in time by one-third of the period. For example, the first phase conductor 332 may transmit a first alternating current, the second phase conductor 334 may transmit a second alternating current offset in time from the first alternating current by approximately 120 degrees (one-third of the period), and the third phase conductor 336 may transmit a third alternating current offset in time from the second alternating current by approximately 120 degrees.

Alternating current may comprise any bi-directional current. For example, alternating current may comprise a sinusoidal waveform, triangular waveform, sawtooth waveform, square waveform, and the like. In a three-phase embodiment, the first coil group 322, second coil group 324, and third coil group 326 may be electrically coupled together, for example at the locations marks "R*", "S*", and "T*".

In the above embodiment, referring to the electromagnetic coil 220 configuration shown in FIG. 3B, the offset alternating currents will produce a series of magnetic fields that rotate around the stator 122. For example, when the first alternating current reaches its maximum, the first coil pair of the first coil group 322 (when traversing the first coil group 322 from "R" to "R*") will produce a maximum magnetic field with a first polarity. Next, the third alternating current reaches its minimum, and the first coil pair of the third coil group 326 (when traversing the third coil group 326 from "T" to "T*") will produce the maximum magnetic field with the first polarity. Next, the second alternating current reaches its maximum, and the second coil pair of the second coil group 324 (when traversing the second coil group 324 from "S" to "S*") will produce the maximum magnetic field with the first polarity. The maximum magnetic field with the first polarity will continue to rotate around the stator as the first alternating current next reaches its minimum, the third alternating current next reaches its maximum, the second alternating current next reaches its minimum, and so on. By varying parameters such as the frequency, current, and/or voltage of the first, second, and third alternating currents, the speed of the rotor may be controlled.

In an alternative embodiment, the stator 122 may be configured according to a ⅔ phase design, comprising two coil groups that are magnetically and electrically 90 degrees apart, with interspersed unwound magnetic poles approximately one-third of the width of the wound poles. The rotor 124 design may be unaffected in this alternative embodiment. For example, the rotor 124 may be configured according to a three-phase design.

Referring again to FIG. 2, the stator 122 may comprise one or more slot liners 240 and/or slot caps 260. The slot liner 240 and slot cap 260 electrically insulate the electromagnetic coil 220 from the stator core 210, and may comprise any suitable electrically-insulating material. In some embodiments, the slot liner 240 and/or slot cap 260 provide physical protection to the electromagnetic coil 220, and may comprise any suitable material. The stator 122 may comprise one or more coil separators 250. The coil separator 250 may electrically insulate neighboring electromagnetic coils 220 from each other and/or may protect the electromagnetic coils 220 from damage. The coil separator 250 may comprise any suitable electrically-insulating material. In one embodiment, the slot liner 240, slot cap 260, and coil separator 250 comprise plastic, such as polyester film. The stator 122 may comprise an outer protector 270 configured to provide protection to and/or electrical insulation for the electromagnetic coil 220 and/or phase conductor 230. In one embodiment, the outer protector 270 may comprise an insulating tape fastened to the electromagnetic coil 220 with string.

Referring to FIG. 3A, the stator 122 may have an outer diameter D1 and an inner diameter D2, which may be any suitable distance. The inner diameter D2 and outer diameter D1 may be chosen based on the requirements for the environment in which the motor 100 is intended to operate. For example, a motor 100 designed to operate in a residential aquatic pumping environment may constrain the external diameter of the motor shell 105 to no more than approximately 6.5 inches. In this example, the outer diameter D1 may be 75 mm to 165 mm and the inner diameter may be from 0 mm to 155 mm. In an exemplary embodiment, the outer diameter D1 may be approximately 155 mm, and the inner diameter D2 may be approximately 66 mm. Factors such as a desired output, maximum rotational velocity, size of the bushings and/or bearings 152, number of stator teeth 212, number of windings, and gauge of the winding wire may affect the size of the inner diameter D2 and outer diameter D1. The stator 122 may be any suitable thickness, for example 5 mm to 150 mm. In an exemplary embodiment, the stator 122 is approximately 28 mm thick.

Referring again to FIGS. 1 and 8, the rotor 124 may react to an applied force by moving. The rotor 124 may comprise any suitable system or method for reacting to a magnetic field. For example, the rotor 124 may comprise permanent magnets in a synchronous motor design, a squirrel cage rotor in an asynchronous motor design, and the like. The rotor 124 and stator 122 may share a common axis, for example the axis of the shaft 130, and the rotor 124 may react to a magnetic field provided by the stator 122 by rotating with respect to the stator 122.

Figure 4:
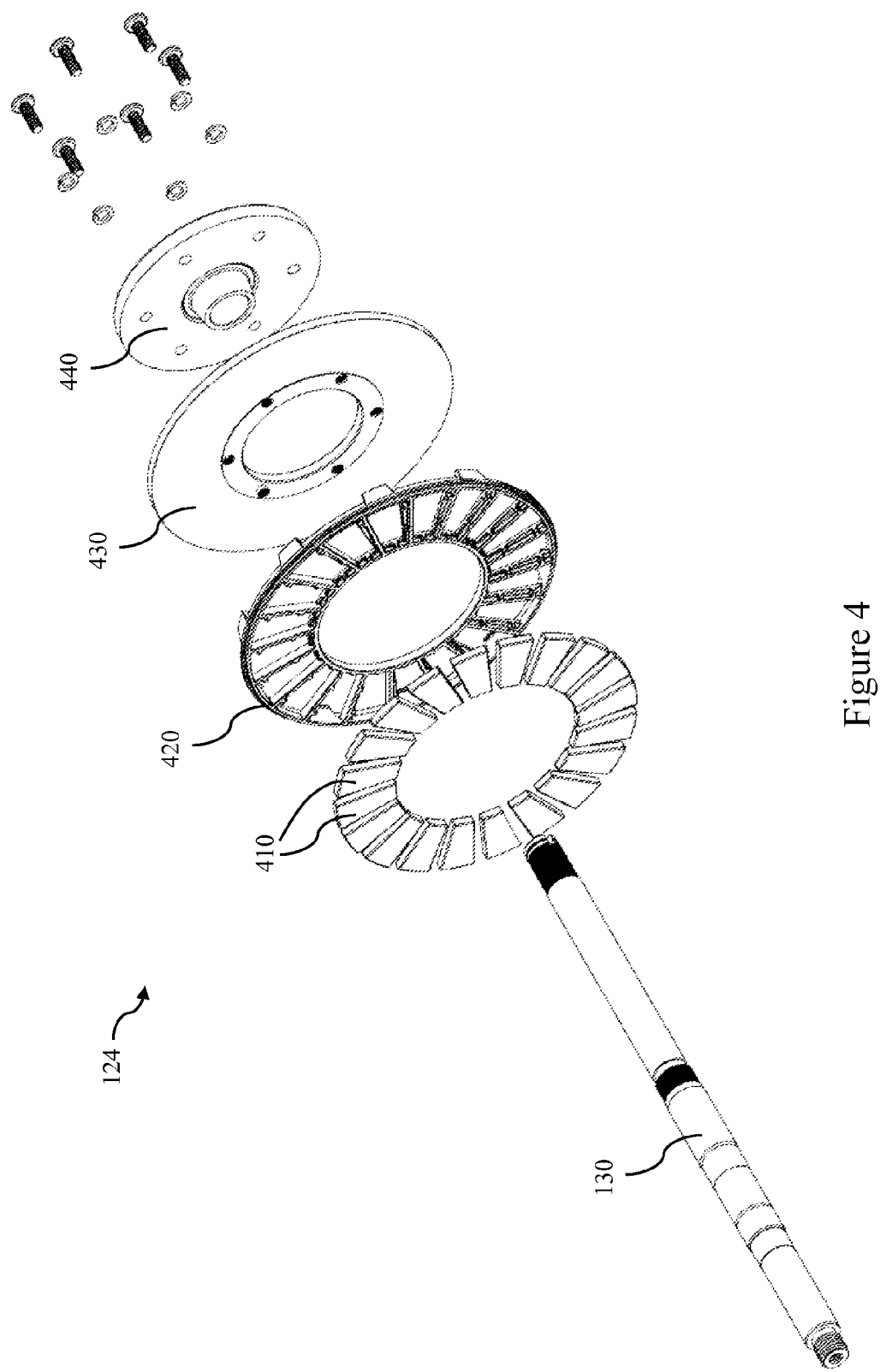
FIG. 4 is an exploded view of a rotor assembly in accordance with an exemplary embodiment of the present invention.
Figure 6:
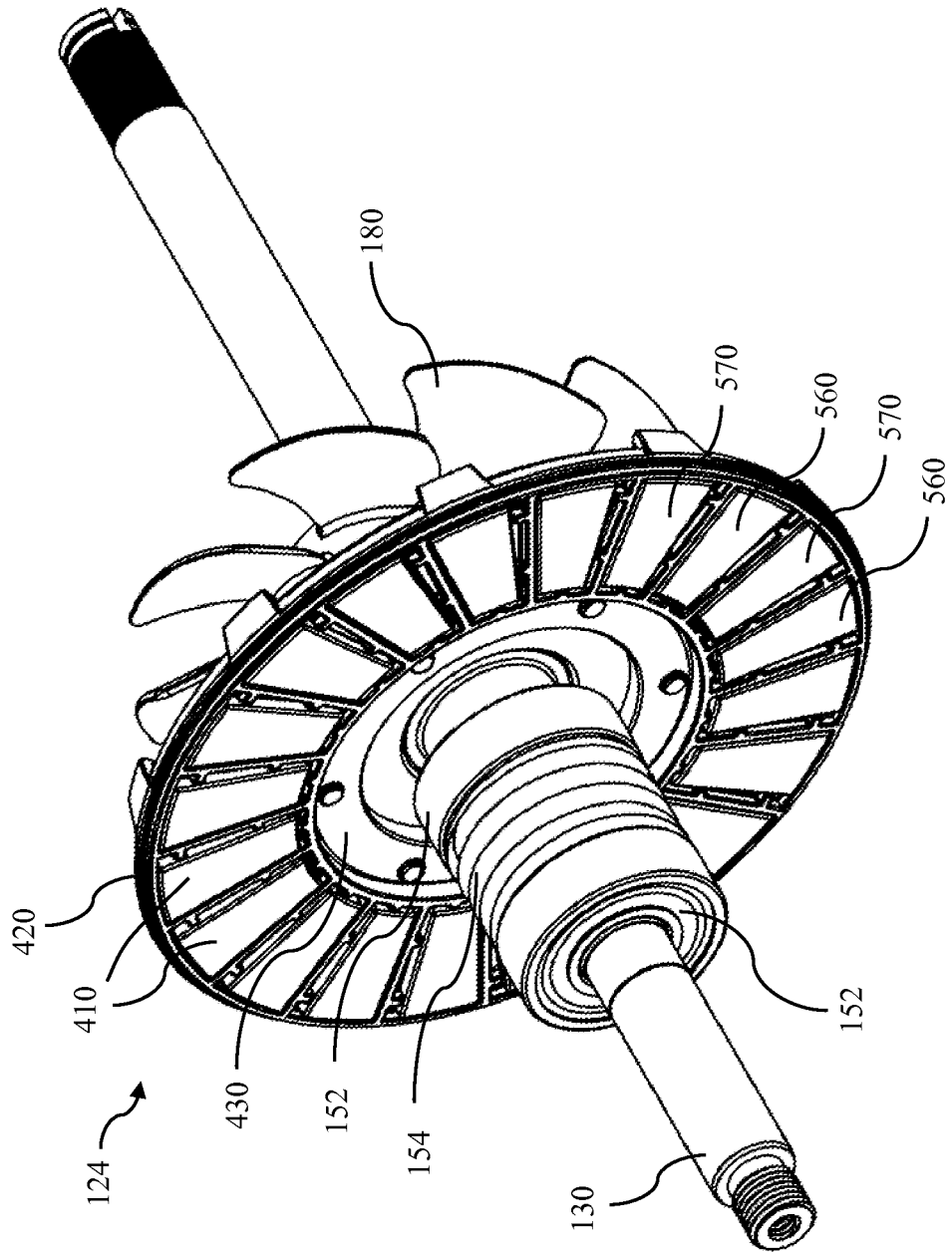
FIG. 6 representatively illustrates a perspective view of the rotor assembly in accordance with an exemplary embodiment of the present invention.

For example, referring now to FIGS. 4 and 6, the rotor 124 may comprise one or more magnetic field sources 410 positioned circularly around a central location, such as the center of the rotor 124 (a point which the axis of the rotor 124 may pass through). The magnetic field source 410 may comprise any system, method, or material configured to provide a magnetic field. In some embodiments, the magnetic field source 410 may comprise a permanent magnet, for example a rare-earth magnet such as a neodymium magnet or a samarium cobalt magnet. The magnetic field source 410 may comprise a sintered or bonded magnet, for example a sintered neodymium magnet. In one embodiment, the magnetic field source 410 may comprise dysprosium, for example a dysprosium-infused neodymium magnet. In another embodiment, the magnetic field source 410 may comprise a grade N35SH NdFeB magnet. The magnetic field source 410 may comprise any combination of the referenced magnet variations, for example a sintered dysprosium-infused neodymium magnet. Further, the magnetic field source 410 may comprise a permanent magnet coated or plated in any suitable material, such as nickel.

The magnetic field source 410 may be shaped and configured in any suitable manner. Referring again to FIG. 4, the magnetic field source 410 may comprise a volume of a magnetic material, such as a neodymium magnet, and may be approximately wedge-shaped. The magnetic field source 410 may comprise a first pair of spaced apart sides disposed generally parallel to one another and a second pair of spaced apart sides that taper inwardly. The first pair of spaced apart sides may be defined by an outer circle and an inner circle, respectively. The outer circle and the inner circle may be concentric. In one embodiment, the first pair of spaced apart sides may comprise arcs of the inner and outer circles. In another embodiment, the first pair of spaced apart sides may comprise straight lines defined by chords of the inner and outer circles.

Figure 5C:
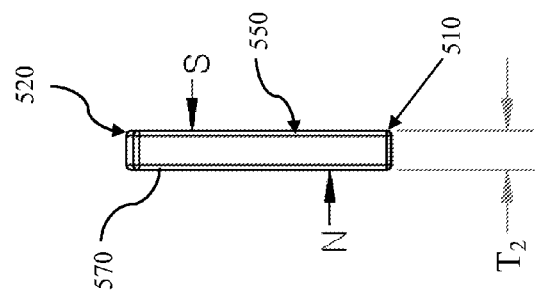
FIG. 5C is a side view of an exemplary south magnetic field source in accordance with an exemplary embodiment of the present invention.
Figure 5B:
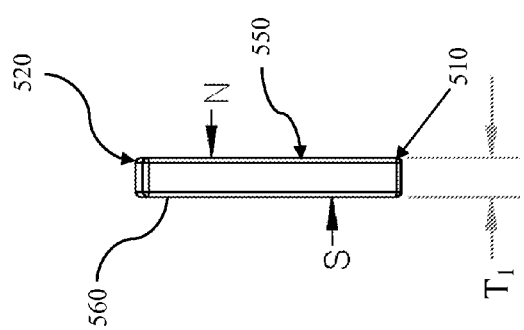
FIG. 5B is a side view of an exemplary north magnetic field source in accordance with an exemplary embodiment of the present invention.
Figure 5A:
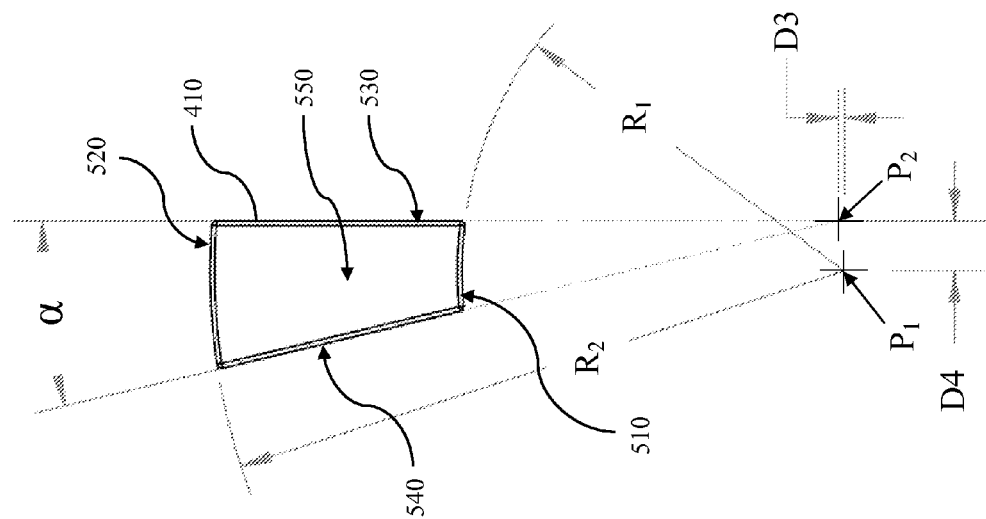
FIG. 5A is a front view of an exemplary magnetic field source in accordance with an exemplary embodiment of the present invention.

In some embodiments, referring to FIG. 5A, the magnetic field source 410 may be approximately shaped as a skewed wedge. The magnetic field source 410 may be defined by a first side 510, second side 520, third side 530, and fourth side 540. For reference, a magnetic field source facing surface 550 is defined as the surface of the magnetic field source 410 that will face the stator 122. The first side 510 may be defined by a first circle with a first radius R1 and the second side 520 may be defined by a second circle with a second radius R2. In one embodiment, the first side 510 and second side 520 comprise a curve defined by an arc of the first and second circles, respectively. In an alternative embodiment, the first side 510 and second side 520 comprise a straight line defined by a chord of the first and second circles, respectively. The first circle and the second circle may be concentric, and the first radius R1 and the second radius R2 may be taken from a first reference point P1.

Still referring to FIG. 5A, the third side 530 may be defined by a first line and the fourth side 540 may be defined by a second line. The first line and the second line may pass through a second reference point P2, and the first line and the second line may define an angle α. In some embodiments, the first reference point P1 and the second reference point P2 are the same point. In some embodiments, the first reference point P1 and the second reference point P2 are distinct points and offset by any suitable distance. In one embodiment, the second reference point P2 may be offset from the first reference point P1 in a first direction by a first distance D3, and the second reference point P2 may be offset from the first reference point P1 in a second direction perpendicular to the first direction by a second distance D4. The first direction may be parallel to first line or the second line. In an exemplary embodiment, the first direction is parallel to the first line and may be referred to as vertical, and the second direction is perpendicular to the first direction and may be referred to as horizontal.

The first radius R1 and the second radius R2 may be any suitable length, the angle α may be any suitable angle, and the first reference point P1 and the second reference point P2 may be at any suitable position and offset by any suitable amount. In one embodiment, the first radius R1 and the second radius R2 may be chosen based on the requirements for the environment in which the motor 100 is intended to operate. For example, a motor 100 designed to operate in a residential aquatic pumping environment may constrain the first radius R1 and second radius R2 to no more than 6.5 inches. In addition, the number of magnetic field sources 210 the rotor 124 comprises may limit or otherwise affect the angle α.

The first radius R1 may be from zero to any length, the second radius R2 may be from 0.001 mm to any length, the angle α may be from 0.1 degrees to 359.9 degrees, the first distance D3 may be from zero to any distance, and the second distance D4 may be from zero to any distance. In some embodiments, the first radius R1 may be from 20 mm to 60 mm, the second radius R2 may be from 30 mm to 100 mm, the angle α may be from 5 degrees to 45 degrees, the first distance D3 may be from 0 mm to 5 mm, and the second distance D4 may be from 0 mm to 15 mm. In an exemplary embodiment, the first radius R1 is approximately 41 mm, for example 41 mm+/−1%, the second radius R2 is approximately 68 mm, for example 68 mm+/−1%, the angle α is approximately 13.46 degrees, for example 13.46 degrees+/−0.5 degrees, the first distance D3 is approximately 0.634 mm, for example 0.634 mm+/−20%, and the second distance D4 is approximately 5.37 mm, for example 5.37 mm+/−3%. The magnetic field source 410 may be made larger without having a large effect on performance or torque capabilities. Therefore, in another exemplary embodiment, the first radius R1 may be less than or equal to 41 mm, and the second radius R2 may be greater than or equal to 68 mm.

The shape of the magnetic field source 410, position of the magnetic field source 410 in the rotor 124, and/or shape of the stator teeth 212 may be configured to facilitate a reduction in torque ripple, torque pulsation, magnetic sheer force, noise, vibration, and the like. For example, the shape of the magnetic field source 410, position of the magnetic field source 410 in the rotor 124, and/or shape of the stator teeth 212 may, when viewed along the axis of the rotor 124, cause an outer portion (respective to the axis of the rotor 124) of a leading and/or trailing edge (respective to the direction of rotor 124 travel) of the magnetic field source 410 to cross a leading and/or trailing edge of the stator tooth 212 before an inner portion of the leading and/or trailing edge of the magnetic field source 410 crosses the leading and/or trailing edge of the stator tooth 212. This skewed shape and/or positioning, where the leading and/or trailing edge of the magnetic field source 410 does not align with the leading and/or trailing edge of the stator teeth 212, reduces the instantaneous (or step) change in the magnetic field strength between the rotor 124 and stator 122, therefore reducing torque ripple (also referred to as cogging).

Figure 7:
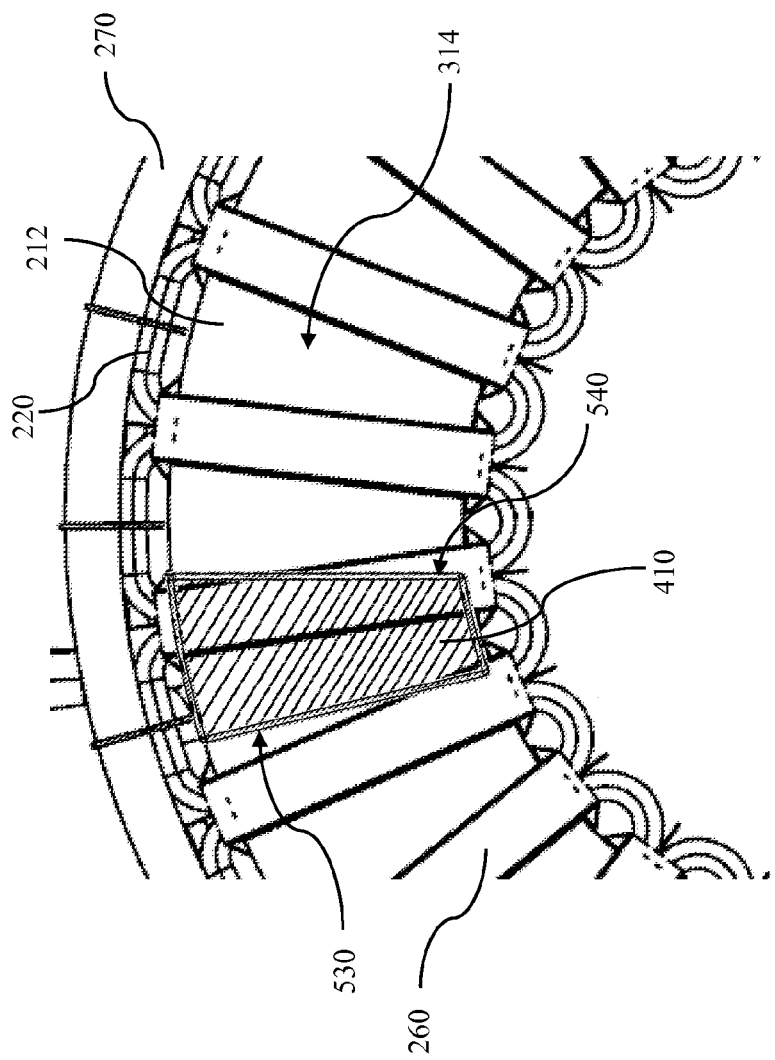
FIG. 7 representatively illustrates the magnetic field source positioned with respect to the stator in accordance with an exemplary embodiment of the present invention.

The magnetic field source 410 may be positioned in the rotor 124 in any suitable orientation. In one embodiment, the magnetic field source 410 is positioned in the rotor 124 with the first reference point P1 located approximately at the axis (or center) of the rotor 124. For example, referring to FIG. 7, when viewed through the rotor 124 to the stator 122, the third side 530 of the magnetic field source 410 may be the trailing edge with respect to the direction of rotation of the rotor 124, and the fourth side 540 of the magnetic field source 410 may be the leading edge of the magnetic field source 410. In this exemplary embodiment, when the rotor 124 rotates, the magnetic field source 410 shape and position on the rotor 124 will cause an outer portion of the fourth side 540 of the magnetic field source 410 to cross a leading and/or trailing edge of the stator tooth 212 before an inner portion of the fourth side 540 crosses the leading and/or trailing edge of the stator tooth 212; similarly, an outer portion of the third side 530 of the magnetic field source 410 may cross a leading and/or trailing edge of the stator tooth 212 before an inner portion of the third side 530 crosses the leading and/or trailing edge of the stator tooth 212.

Referring to FIGS. 5B and 5C, the magnetic field source 210 may have any suitable thickness and magnetization. For example, and referring to the side view of the magnetic field source shown in FIG. 5B, a north magnetic field source 560 may comprise a magnetic field source 410 having a first thickness T1 and a north magnetic pole oriented toward the magnetic field source facing surface 550 and a south magnetic pole oriented away from the magnetic field source facing surface 550. For further example, and referring to the side view of the magnetic field source shown in FIG. 5C, a south magnetic field source 570 may comprise a magnetic field source 410 having a second thickness T2 and a south magnetic pole oriented toward the magnetic field source facing surface 550 and a north magnetic pole oriented away from the magnetic field source facing surface 550. The first thickness T1 and the second thickness T2 may be any suitable thickness. In some embodiments, the first thicknesses T1 and the second thickness T2 may be the same, and may be from 0.1 mm to 15 mm. In an exemplary embodiment, the first thickness T1 and the second thickness T2 are 4 mm+/−10%.

In some embodiments, referring again to FIG. 6, the rotor 124 may comprise a plurality of magnetic field sources 410 arranged circularly around the axis of the rotor 124, and each of the plurality of magnetic field sources 410 may be oriented in a direction of opposite magnetic polarity to a neighboring magnetic field source 410. For example, the rotor 124 may comprise alternating north magnetic field sources 560 and south magnetic field sources 570. In one embodiment, the rotor 124 comprises twenty magnetic field sources 410 comprising ten north magnetic field sources 560 alternated with ten south magnetic field sources 570. In one embodiment, the rotor 124 comprises twenty magnetic field sources 410 and the stator 122 comprises twenty-four (24) stator teeth 212 and twenty-four (24) electromagnetic coils. The ratio of magnetic field sources 410 to stator teeth 212 and electromagnetic coils 220 may be determined to reduce the abruptness of the passing of the magnetic field sources 410, thereby reducing vibration and noise (also referred to as cogging).

Referring again to FIG. 4, the rotor 124 may further comprise a backing plate 430. The backing plate 430 may comprise any system or material suitable for providing support for the magnetic field source 410, providing a magnetic flux path, and/or providing a substrate for supporting a retainer 420. For example, the backing plate 430 may comprise steel or other ferrous materials of suitable mechanical strength and magnetic permeability. The magnetic field source 410 may be coupled with the backing plate 430 in any suitable manner. For example, the magnetic field source 410 may be coupled to the backing plate 430 using glue, epoxy, fasteners, clips, and the like. The rotor 124 may comprise a retainer 420. The retainer 420 may comprise any suitable system or method for orienting the magnetic field source 410 in relation to the backing plate 430. The rotor 124 may be directly and/or indirectly coupled to the shaft 130 in any suitable manner. In one embodiment, a hub 440 may be configured to couple to the backing plate 430 and the shaft 130, thereby coupling the rotor 124 to the shaft 130. In another embodiment, the backing plate 430 may be configured to couple directly to the shaft 130.

Figure 9:
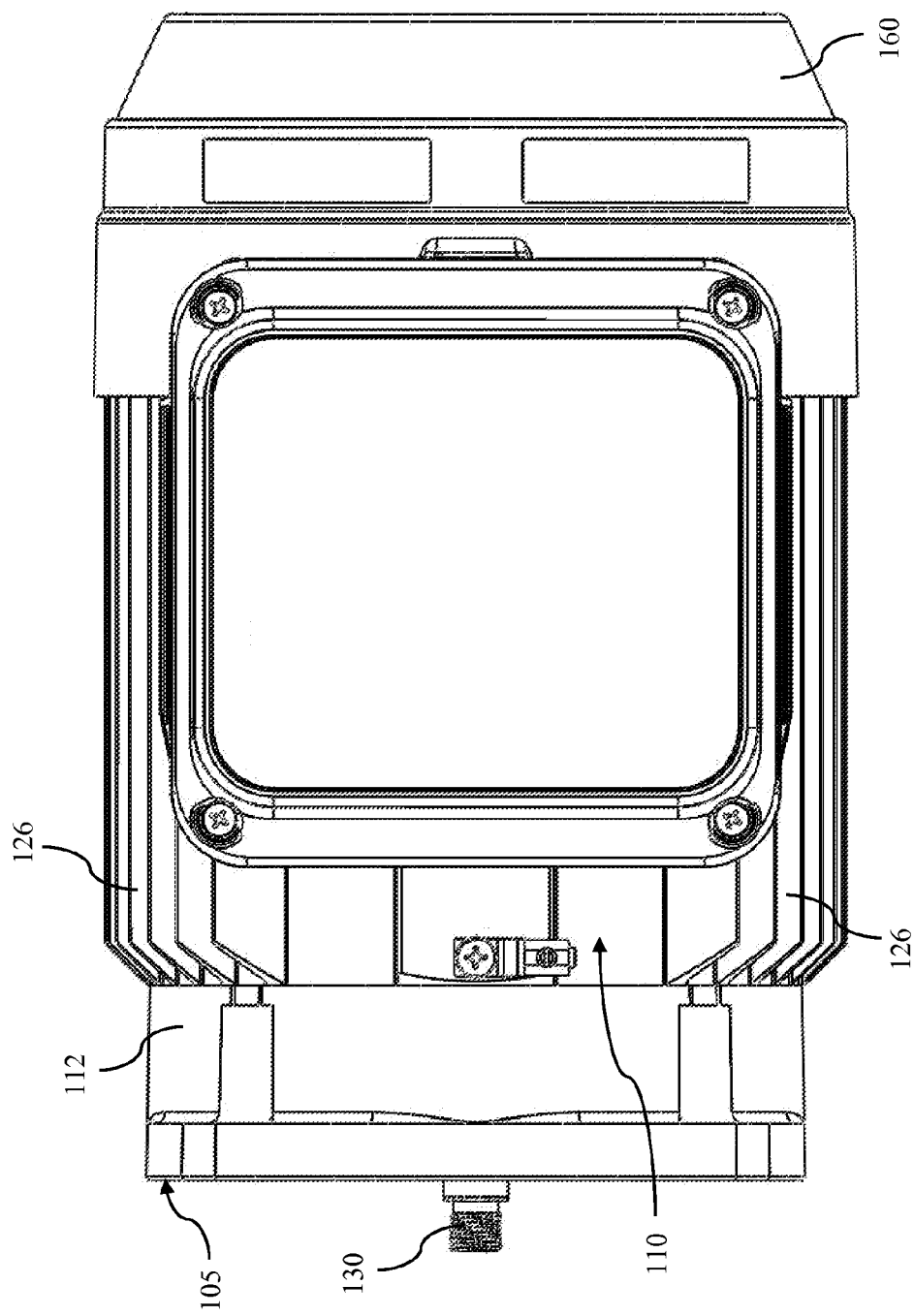
FIG. 9 is a top-down view of a motor shell with a plurality of fins in accordance with an exemplary embodiment of the present invention.

Referring now to FIGS. 1 and 9, the motor 100 may be configured to provide increased cooling efficiency. For example, in one embodiment, the motor 100 may comprise one or more fins 126 running longitudinally along the sidewall portion 110 between the first end 112 and the second end 116. The fins 126 may be suitably configured to act as heat sinks to dissipate heat absorbed by the shell 105 into an ambient environment surrounding the motor 100. The fins 126 may be formed integrally with the shell 105 or they may be coupled to the shell by any suitable method. For example, the sidewall portion 110 may be cast as a single piece of aluminum having a plurality of parallel fins 126 extending outwardly from an exterior surface of the sidewall portion 110. The fins 126 may be disposed along the shell 105 in any suitable manner. For example, referring to FIG. 9, two sets of fins 126 may be disposed along opposite sides of the shell 105 to provide increased heat dissipation along more than one exterior surface section of the motor 100.

The fins 126 may comprise any suitable material for conducting heat into the ambient environment. For example, the fins 126 may comprise a metal material having a relatively high rate of thermal conductivity such as aluminum, beryllium, magnesium, silver, and/or any suitable alloy. In one embodiment, the fins 126 may be comprised of the same material as the shell 105.

Figure 10B:
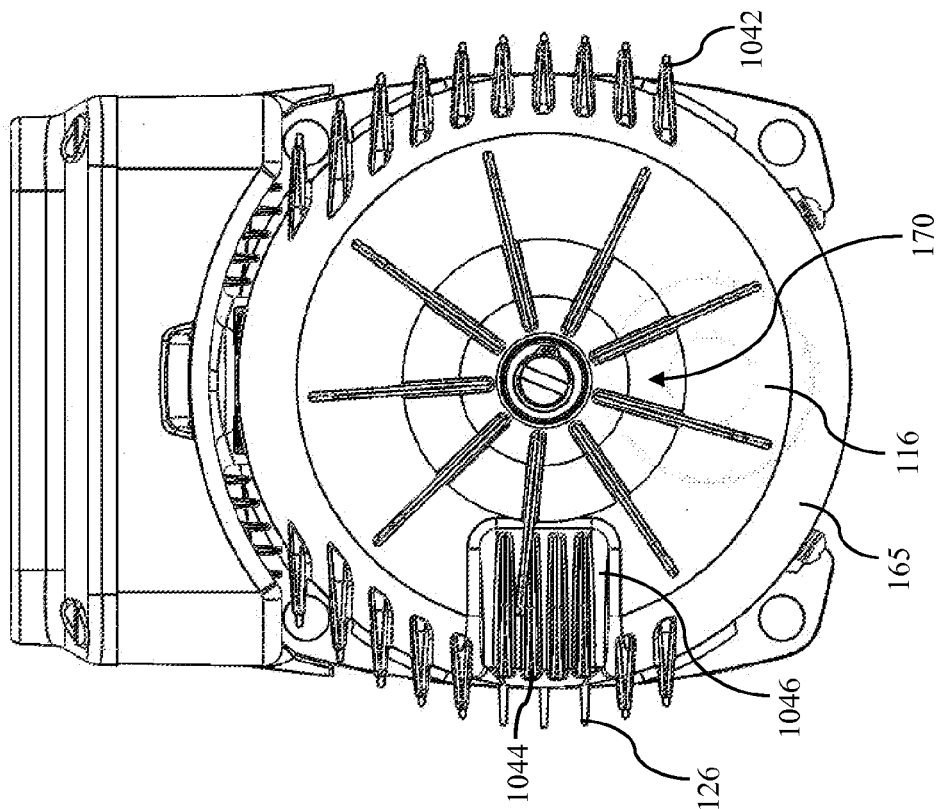
FIG. 10B is a rear view of the motor shell and a fan assembly in accordance with an exemplary embodiment of the present invention.
Figure 10A:
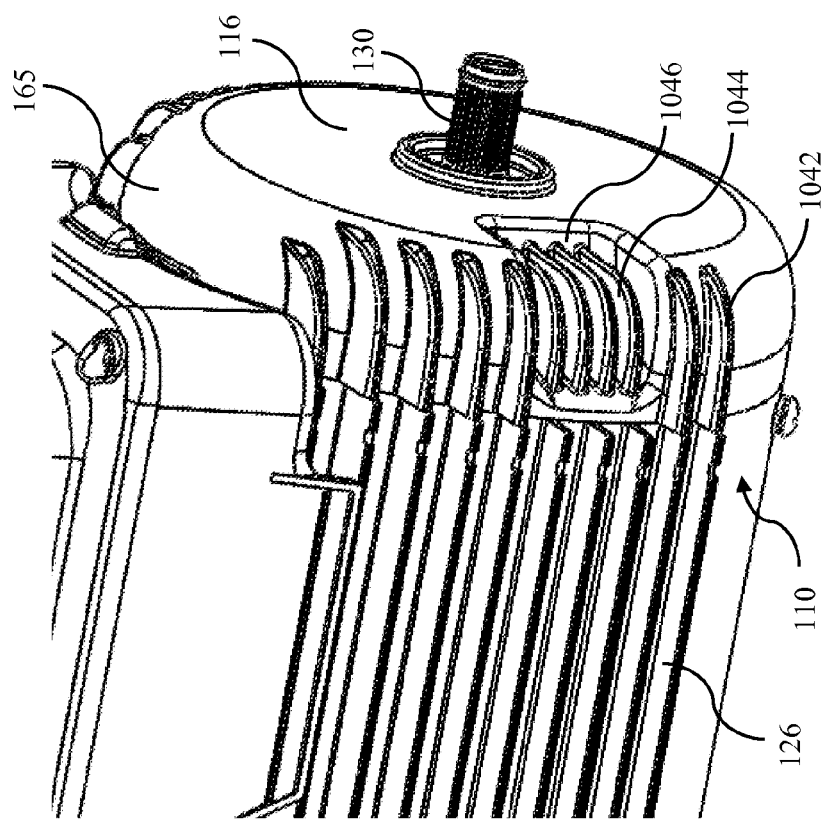
FIG. 10A representatively illustrates curved surfaces of the motor shell in accordance with an exemplary embodiment of the present invention.

Referring now to FIGS. 1, 10A, and 10B, the second end 116 of the motor 100 may comprise a transition section 165 configured to help direct an airflow from the first fan assembly 170 to the fins 126. The transition section 165 may comprise any suitable size or shape for providing a more laminar airflow path between the first fan assembly 170 and the fins 126. For example, the transition section 165 may comprise a rounded surface suitably configured to reduce a transitional angle between the sidewall portion 110 of the motor 100 and an exterior surface of the second end 116 of the motor 100. In one embodiment, the rounded surface may form a curved arc segment extending between the substantially perpendicular surfaces of the second end 116 and the sidewall portion 110, wherein the arc segment has a radius between one-half and one and one-half inches. In a second embodiment, the rounded surface may define a portion of an elliptical curve extending between the substantially perpendicular surfaces of the second end 116 and the sidewall portion 110.

The transition section 165 may further comprise a series of parallel heat fins 1042 that extend outwardly from the rounded surface and align with the plurality of fins 126 running along the sidewall portion 110. An outer edge of each of the parallel heat fins 1042 may define a curved and/or rounded shape similar to that of the rounded surface of the transition section 165. For example, the rounded surface and the outer edge of the parallel heat fins 1042 may each comprise arc segments having the same radius. Alternatively, the rounded surface and the outer edge of the parallel heat fins 1042 may form curves of differing radius.

Referring again to FIGS. 1, 10A, and 10B, the transition section 165 may further comprise a recessed surface 1046 projecting inward along the second end 116. The recessed surface 1046 may be positioned along the transition section 165 relative to the first fan assembly 170 to create a channel configured to provide enhanced cooling capability to an internal portion of the shell 105. For example, the recessed surface 1046 may provide additional cooling to one or more internal electrical components housed proximal to the second end 116 of the shell 105. The recessed surface 1046 may comprise any suitable size or shape for providing enhanced cooling capability to the internal portion of the shell 105 while still providing for a more laminar airflow. For example, the recessed surface 1046 may comprise a rounded surface. In one embodiment, the recessed surface 1046 may define a portion of an elliptical curve extending between the substantially perpendicular surfaces of the second end 116 and the sidewall portion 110. The recessed surface 1046 may comprise one or more recess fins 1044 that project outward from the recessed surface 1046 to substantially align with transition section 165. The recess fins 1044 may be configured to act as heat fins and direct the airflow from the first fan assembly 170 to the fins 126 of the sidewall portion 110.

Figure 11:
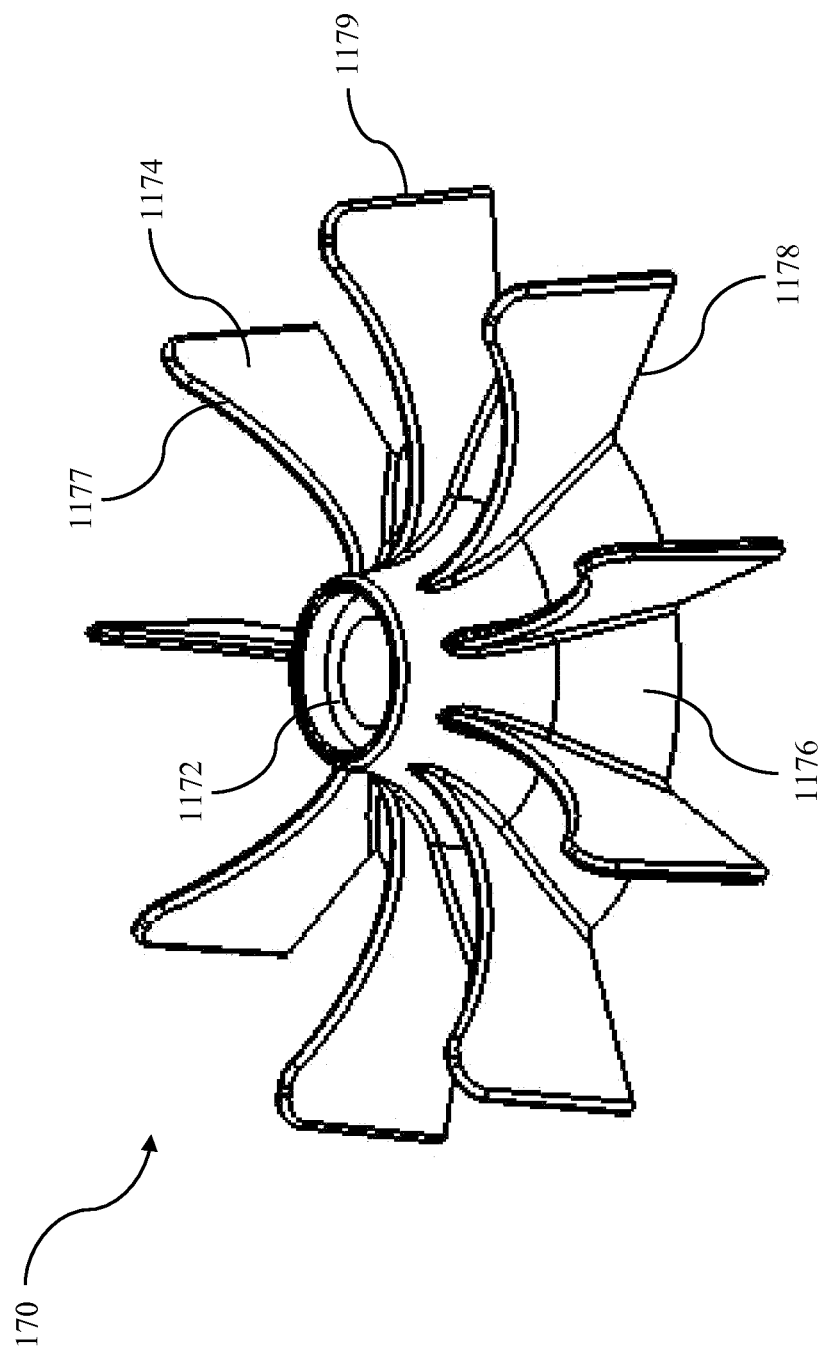
FIG. 11 is a perspective view of the fan assembly in accordance with an exemplary embodiment of the present invention.

Referring now to FIGS. 1 and 11, the first fan assembly 170 facilitates airflow along the fins. The first fan assembly 170 may comprise any suitable system or device for providing the airflow along the exterior of the motor 100 to facilitate dissipation of heat. For example, the first fan assembly 170 may comprise a hub 1172, a plurality of fan blades 1174, and a plurality of air guides 1176. The first fan assembly 170 may be configured to rotate in conjunction with the shaft 130 such that the airflow is created when the motor 100 is operating.

The hub 1172 couples the first fan assembly 170 to the shaft 130 and may comprise any suitable device or system. In one embodiment, the hub 1172 may comprise a center portion of the first fan assembly 170 and define an open center area suitably configured to fit around the shaft 130 such that the hub 1172 may be slid along the shaft 130 to a desired mounting location. The hub 1172 may be coupled to the shaft 130 by any suitable method. For example, the open center area of the hub 1172 may be configured to be slid along an end portion of the shaft 130 having an external diameter substantially the same as a diameter of the open center area and held in place by one or more couplers positioned on the shaft 130 on either side of the hub 1172. In a second embodiment, the open center area may comprise a set of geared teeth suitably configured to mate to a set of geared teeth disposed along the shaft 130. In a third embodiment, the hub 1172 may be coupled to the shaft by a pressure fit created by sliding the open center area over the shaft 130.

The hub 1172 may be directly coupled to the shaft 130 such that the two components rotate in a one-to-one ratio or the hub 1172 may be indirectly coupled to the shaft 130 such that the hub 1172 and the shaft 130 may rotate at different speeds. For example, the hub 1172 may be coupled to the shaft by a reduction mechanism that is configured to allow the hub 1172 to be selectively rotated at various speeds from about zero up to the full rotational speed of the shaft 130. The reduction mechanism may be selectively controlled according to any suitable criteria such as an internal temperature of the motor 100 and/or an exterior surface temperature of the motor 100.

The plurality of fan blades 1174 extend radially outward from the hub 1172 and create the airflow when the hub 1172 is rotated by the shaft 130. The plurality of fan blades 1174 may comprise any suitable shape or design for moving air across the shell 105 of the motor 100. Each fan blade from the plurality of fan blades 1174 may comprise a leading edge 1177, trailing edge 1178, and a blade tip 1179.

In one embodiment, the trailing edge 1178 may be positioned proximate the second end 116 with the leading edge 1177 facing outwardly away from the second end 116. The leading edge 1177 may comprise a curved surface as it extends outward from the hub 1172 to define a generally increasing chord length of the blade between the hub 1172 and the blade tip 1179. The curved surface of the leading edge 1177 may provide an area for incoming air to collect before being forced radially outward. Referring briefly to FIGS. 11 and 13, the fan guard 160 may comprise an air intake 1360, and the curved surface of the leading edge 1177 may facilitate a reduction or elimination of noise caused by the fan blade 1174 moving by the air intake 1360. Referring again to FIGS. 1 and 11, the curved leading edge 1177 may be defined by an arc segment having a radius of any size which may be determined according to any suitable criteria such as a desired amount of airflow, an overall radius of the first fan assembly 170, or the outer dimensions of the motor 100. In one embodiment, the leading edge 1177 comprises an elliptically-curved surface. Alternatively, the leading edge 1177 may comprise a straight or angled surface between the hub 1172 and the blade tip 1179.

The trailing edge 1178 may be separated from the second end 116 by any suitable distance. For example, the trailing edge 1178 may be separated from the second end 116 by a gap of about one thirty-seconds of an inch to about half an inch. The trailing edge 1178 may also be configured to be angled relative to the exterior surface of the second end 116 proximate the first fan assembly 170. For example, the exterior surface of the second end 116 proximate the first fan assembly 170 may form a substantially planar surface. The trailing edge 1178 may comprise a substantially linear surface having an angle of between one-half a degree and about four degrees relative to the exterior surface of the second end 116 as the trailing edge 1178 extends from the hub 1172 to the blade tip 1179 resulting in a larger gap between the trailing edge 1178 and the exterior surface of the second end 116 at the blade tip 1179 than at the hub 1172.

The blade tip 1179 extends between the leading edge 1177 and the trailing edge 1178 to define a blade length. The blade tip 1179 may be configured in any suitable manner according to a desired airflow result. For example, in one embodiment, the blade tip 1179 may form a substantially perpendicular line relative to the exterior surface of the second end 116 as it extends from the leading edge 1177 to the trailing edge 1178. In a second embodiment, the blade tip 1179 may be angled relative to a normal line extending outward from the exterior surface of the second end 116. In a third embodiment, the blade tip 1179 may comprise projections such as winglets suitably configured to increase an efficiency of the first fan assembly 170.

The air guides 1176 provide a smooth turning radius for the incoming airflow. The air guides 1176 may comprise any suitable device or system for reducing a transition angle between the incoming airflow and the exterior surface of the second end 116 of the shell 105. In one embodiment, each air guide 1176 comprises a surface extending between two fan blades from the hub 1172 to a position approximately midway along the length of the fan blade 1174. The surface may be curved to form an increasing angle between the hub 1172 and the exterior surface of the second end 116. For example, each air guide 1176 may comprise an elliptical surface configured to reduce an incidence angle between the moving airflow and the exterior surface of the second end 116 to reduce an amount of turbulence in the airflow resulting from a substantially ninety degree turn in direction.

Figure 12:
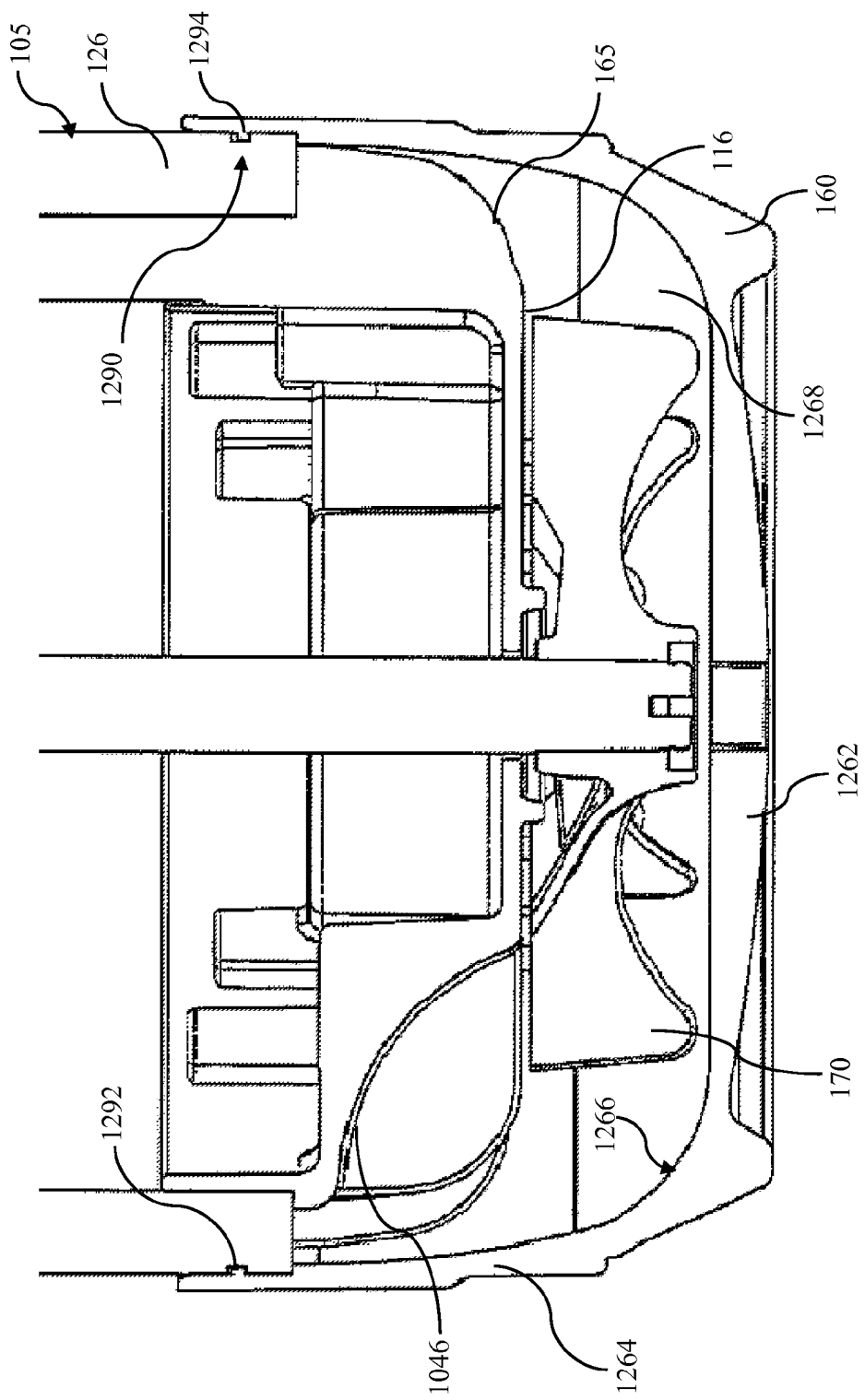
FIG. 12 representatively illustrates a fan guard in accordance with an exemplary embodiment of the present invention.

Referring to FIGS. 10B, 11, and 12, the air guides 1176 may be shaped to direct the incoming airflow to the recessed surface 1046. Each air guide 1176 may comprise a surface extending between two fan blades from the hub 1172 to a position approximately adjacent to where the second end 116 intersects the recessed surface 1046. In one embodiment, each air guide 1176 comprises two elliptical curves that are tangent at their intersection.

Referring now to FIG. 12, the fan guard 160 covers the first fan assembly 170 and allows for an intake of air. The fan guard 160 may comprise any suitable device for covering the first fan assembly 170 such as a cover, a cage, a duct, and the like. In one embodiment, the fan guard 160 may comprise a cover configured to be selectively coupled to the shell 105. For example, the cover may comprise an end portion 1262 and at least two sidewalls 1264 extending outwardly from the end portion 1262. The cover may be suitably configured to form an interior cavity 1268 capable of substantially enclosing the first fan assembly 170 when the cover is coupled to the shell 105. The interior cavity 1268 may be at least partially defined by an interior surface 1266 of the cover and the exterior surface of the second end 116. The interior surface 1266 may comprise one or more curved surfaces to further reduce airflow turbulence between the end portion 1262 and the transition section 165. For example, the interior surface 1266 may be shaped to help exhaust the airflow created by the first fan assembly 170 towards the transition section 165. In one embodiment, the interior surface 1266 may comprise an elliptically-curved surface.

The fan guard 160 may be coupled to the shell 105 by any suitable method. For example, in one embodiment, the sidewalls 1264 may be suitably configured to be mechanically coupled to the shell 105 by a fastener such as a screw or bolt. In a second embodiment, the sidewalls 1264 of the fan guard 160 may be configured to be coupled to the shell 105 by a tabbed locking system 1290. For example, the sidewall 110 and/or fins 126 of the shell 105 may comprise a plurality of notches 1292. The sidewalls 1264 of the fan guard 160 may comprise a protruding tab 1294 extending along at least a portion of the interior surface 1266 of the fan guard 160. The protruding tab 1294 may be suitably configured to fit into the plurality of notches 1292 to securely couple the fan guard 160 to the shell 105. In yet another embodiment, the fan guard 160 may be suitably configured to be screwed onto the second end 116 of the shell 105.

Referring now to FIGS. 12, 13A, and 13B, the end portion 1262 of the fan guard 160 may comprise an air intake 1360 configured to allow air to enter the interior cavity 1268. For example, the air intake may comprise a series of openings disposed along the surface of the end portion 1262. The openings may comprise any suitable shape or size to allow for the intake of air and while reducing a likelihood of undesired contact of foreign objects with the first fan assembly 170. In one embodiment, the series of openings may comprise holes of less than about one-quarter of an inch. In a second embodiment, the openings may be configured in a multi-layered overlapping pattern creating a non-linear path between the ambient environment and the interior cavity 1268.

Referring again to FIG. 1, the motor electronics assembly 140 may comprise any suitable system or method for operating the drive unit 120. The motor electronics assembly 140 may comprise one or more motor regulation inputs for receiving electric power and control signals for the operation of the drive unit 120. The electric power and control signals may be referred to as motor regulation signals. The motor regulation input may comprise one or more electric power inputs and/or one or more control signal inputs. The motor regulation inputs may comprise any system configured to electrically and/or communicatively couple with a conductor (electrical or otherwise) capable of delivering the motor regulation signals. For example, a motor regulation input may comprise one or more suitable fiber optic terminals, screw terminals, wire connectors, wire nuts, terminals capable of being soldered, and the like.

The motor electronics assembly 140 may be configured to receive, by one or more electric power inputs, electric power capable of powering the movement of the drive unit. In one embodiment, the motor electronics assembly 140 may be configured to receive 120 VAC electric power by one or more electric power inputs. The motor electronics assembly 140 may be configured to provide one or more electric currents to the drive unit 120, from which the drive unit 120 may generate one or more magnetic fields that cause rotation of at least a portion of the drive unit 120, such as the rotor 124. The one or more electric currents provided to the drive unit 120 may be referred to as drive currents.

The motor electronics assembly 140 may be configured to receive, by one or more control signal inputs, one or more control signals for controlling the operation of the drive unit 120. The motor electronics assembly 140 may be configured to control the operation of the drive unit 120 in any suitable manner, for example by varying, altering, or otherwise controlling the frequency, voltage, phase, and/or amperage of the one or more drive currents to start the rotor 124, stop the rotor 124, affect the rotor 124 speed, affect the drive unit 120 torque, and the like. In one embodiment, the motor electronics assembly 140 is configured to control the drive unit 120 using field-oriented control ("FOC"), which may also be referred to as vector control. For example, the motor electronics assembly 140 may be configured to execute a FOC algorithm to control the voltage and frequency of the one or more drive currents.

In one embodiment, the motor electronics assembly 140 comprises one or more electric power inputs, and a plurality of control signal inputs comprising one or more low voltage automation inputs, one or more dry contact inputs, and one or more high-speed signal inputs. The motor electronics assembly 140 may be configured to operate the drive unit according to the one or more electric power inputs. For example if a plurality of electric power inputs each correspond to a different drive unit 120 speed, the motor electronics assembly 140 may operate the drive unit 120 according to which of the plurality of electric power inputs is receiving electric power. A multi-speed power source, such as a multi-speed timer, may provide electric power to one or more of the plurality of electric power inputs at a time. In addition or alternatively, a single-speed power source, such as a 120 VAC and common line, may provide electric power to the electric power inputs.

The motor electronics assembly 140 may be configured to operate the drive unit 120 according to the one or more low voltage automation inputs. For example, the low voltage automation inputs may indicate whether the drive unit 120 should start or stop, and/or which speed the drive unit 120 should operate at. The motor electronics assembly 140 may be configured to operate the drive unit 120 according to the high-speed signal input, which will be described in further detail below.

The motor electronics assembly 140 may be configured to provide, by one or more control signal inputs, one or more indications of a state of the motor 100. In one embodiment, the motor electronics assembly 140 may be configured to provide a state of the motor 100 on the dry contact inputs. For example, in the motor electronics assembly 140, each dry contact input may be electrically coupled with a relay, and may indicate which speed the drive unit 120 is operating at and/or if the drive unit 120 has started or stopped by coupling the appropriate dry contact input with ground, a common line, a reference voltage, and the like.

In one embodiment, the various electric power inputs and control signal inputs may indicate a general speed at which the motor 100 should operate, for example slow, medium, or fast, and the motor electronics assembly 140 may operate the drive unit 120 at a predetermined speed (whether a fixed, user-settable, or otherwise determined speed) that has been associated with the general speed.

Referring to FIGS. 1 and 3, the motor electronics assembly 140 may generate or otherwise provide the one or more drive currents, and the one or more drive currents may be suitable for causing an electromagnetic coil 220 to generate the magnetic field. The motor electronics assembly 140 may be electrically coupled with the one or more phase conductors 230 to provide one or more drive currents to the one or more electromagnetic coils 220. In one embodiment, the motor electronics assembly 140 may be electrically coupled with the first phase conductor 332, the second phase conductor 334, and the third phase conductor 336, and may provide a first drive current to the drive unit 120 through the first phase conductor 332, a second drive current to the drive unit 120 through the second phase conductor 334, and a third drive current to the drive unit 120 through the third phase conductor 336. The first, second, and third drive currents may comprise alternating currents.

The motor electronics assembly 140 may comprise a power electronics assembly and a control electronics assembly. The power electronics assembly may comprise any suitable system or method configured to generate one or more drive currents by converting one or more electric power inputs into one or more drive currents. The power electronics assembly may comprise systems and components that allow the control and conversion of an electric current, such as turning the current on and off, and varying, adjusting, or otherwise controlling the frequency, phase, amperage, and/or voltage of the electric current. For example, the power electronics assembly may comprise a DC/AC inverter, AC/DC rectifier, DC-DC or AC-AC converter, contactor, electrical relay, active power factor correction circuitry, and the like.

In some embodiments, the power electronics assembly may convert electric power received by one electric power input into a plurality of drive currents, for example generating a multi-phase alternating current from a single-phase electric power input current. In one embodiment, the power electronics assembly generates, from a single-phase AC electric power input current, three AC drive currents offset in time from each other by one-third of the drive current period. In an alternative embodiment, the power electronics assembly generates, from a single DC electric power input current, three AC drive currents offset in time from each other by one-third of the drive current period.

The control electronics assembly controls the generation and/or characteristics of the one or more drive currents. The control electronics assembly may also provide information corresponding to the state of the motor 100, such as the speed the drive unit 120 is operating at, whether the drive unit 120 is running, one or more internal and/or external temperatures, and the like. The control electronics assembly may comprise any suitable system or method for controlling the power electronics assembly. The control electronics assembly may be configured to vary, adjust, or otherwise control the frequency, phase, amperage, and/or voltage of the one or more drive currents. The control electronics assembly may be configured to control the power electronics assembly to turn on and/or off the one or more drive currents. The control electronics assembly may be configured to control the power electronics assembly to electrically connect to and/or disconnect from the one or more electric power inputs. The control electronics assembly may be electrically coupled with the power electronics assembly and may be configured to control components and systems of the power electronics assembly such as an electrical relay, contactor, DC/AC inverter, AC/DC rectifier, DC-DC or AC-AC converter, and the like. Accordingly, the control electronics assembly may be configured to control the speed, torque, and the like, of the drive unit 120.

One or more components of the motor electronics assembly 140 may be mounted using potting compounds that have a high thermal conductivity to facilitate heat transfer away from the one or more components.

The control electronics assembly may operate at least partially based on control signals received by the one or more control signal inputs. For example, the one or more control signal inputs may be communicatively coupled with an output of an external system controller. The control signals received on the one or more control signal inputs may indicate what speed the motor 100 should operate at and/or for how long, may transmit an operating program designed to operate the motor (described below), may indicate whether the motor 100 should be controlled by a stored operating program or by an external system controller, may indicate whether the motor 100 should operate in a high-speed mode, and the like. The control electronics assembly may also provide the information regarding a state of the motor 100 to the external system controller.

An operating program, which may also be referred to as a profile, may comprise any instructions for controlling the power electronics assembly to operate the drive unit 120. The control electronics assembly may be configured to store, modify, and/or execute one or more operating programs. The one or more operating programs may be stored in any suitable memory device or combination of memory devices, for example a random access memory (RAM), a read-only memory (ROM), a flash memory, a hard drive, a microcontroller memory, and the like. The execution of the operating program may be performed by any suitable processing device, for example a special-purpose processor, a general-purpose microprocessor specifically programmed to execute the operating program, a microcontroller programmed to execute the operating program, and the like. The memory device may be communicatively coupled with the processing device to facilitate the execution of the operating program.

In a first example, the operating program may comprise one or more instructions for causing the power electronics assembly to operate the drive unit 120 at a certain speed for a certain amount of time. In a second example, the operating program may comprise one or more instructions for causing the power electronics assembly to operate the drive unit 120 at a first speed for a first amount of time, and a second speed for a second amount of time. In a third example, the operating program may comprise one or more instructions for causing the power electronics assembly to operate the drive unit 120 at a first speed for a first amount of time, and to operate the drive unit 120 in a stopped state (e.g. by providing no drive current to the drive unit 120) for a second amount of time. For reference, a stopped state may comprise a speed of zero. In a fourth example, the operating program may comprise one or more instructions for causing the power electronics assembly to operate the drive unit 120 at a first speed when a predetermined condition is detected. The predetermined condition may comprise any suitable condition, such as the motor regulation signals present on the motor regulation inputs, a temperature, and the like.

The control electronics assembly may comprise one or more sensors, and may be configured to monitor a state of the motor 100. The control electronics assembly may be configured to react to the state of the motor 100. For example, the control electronics assembly may comprise a temperature sensor, and may monitor and react to the temperature at one or more locations in the motor 100. For further example, the control electronics assembly may comprise any suitable system or method for monitoring and/or measuring the speed of the rotor 124, monitoring and/or measuring one or more of the electric power inputs and/or control signal inputs, monitoring and/or measuring one or more currents in the motor 100 for a short circuit, undervoltage, overvoltage, and the like, monitoring for a loss of communication with a user interface, and the like. The control electronics assembly may react to the monitored and/or measured state in any suitable manner, for example by activating short circuit protection, stopping operation of the motor 100, and the like.

The motor electronics assembly 140 may comprise an embedded electronics assembly. The embedded electronics assembly is contained within the interior volume of the motor shell 105 and may comprise at least some of the power electronics assembly and/or at least some of the control electronics assembly. The embedded electronics assembly therefore provides additional protection to the power electronics assembly and/or control electrics assembly against the environment exterior to the motor shell 105. In one embodiment, the embedded electronics assembly comprises the entirety of the power electronics assembly and control electronics assembly. One or more components of the motor electronics assembly 140 may be located at the point of lowest air temperature, to facilitate heat transfer away from the one or more components.

The embedded electronics assembly may generate heat, and may be positioned at or near the motor shell 105 to remove heat via thermal conduction through the motor shell 105. In one embodiment, the embedded electronics assembly is positioned proximal to the second end 116 of the motor shell 105. As previously described, the first fan assembly 170 and fins 126 may aid the removal of heat via thermal conduction by providing air flow along the motor shell 105 and increasing the motor shell 105 surface area. The second fan assembly 180 may also aid the removal of heat from the embedded electronics assembly by causing movement of air interior to the motor shell 105 and therefore across one or more components of the embedded electronics assembly. The second fan assembly 180 may circulate the air inside the motor shell 105 to reduce the air stratification and hot spots interior to motor shell 105.

Components of the motor electronics assembly 140 that are not within an air flow of either the first fan assembly 170 or the second fan assembly 180, and/or components that require additional heat dissipation, may be thermally coupled to the motor shell 105 to facilitate heat dissipation. In one embodiment, the motor electronics assembly 140 comprises a power dissipating device, and the embedded electronics assembly may be configured and positioned such that heat generated by the power dissipating device is at least partially dissipated through the second end 116 of the motor shell 105. For example, the power dissipating device, such as a power module, may be touching or almost touching an interior surface of the second end 116 of the motor shell 105.

A motor 100 according to various aspects of the present invention, for example according to various aspects of the thermal regulation design and embedded electronics assembly, may sustain full operation in an environment having an ambient temperature of 60 degrees Celsius or less. For example, methods and apparatus for a motor according to various aspects of the present invention may be applied to a residential aquatic pumping environment to provide a motor 100 approximately 6.5 inches in diameter and approximately 12 inches or less in length, having an output of approximately 2.8 horsepower, able to operate continuously in 60° C. ambient temperatures, and able to generate more torque per weight of active material and being 30-40% lighter than conventional aquatic pumping motors.

The motor electronics assembly 140 may be configured to receive a signal indicating that the motor 100 should operate in a high-speed mode, and the motor electronics assembly 140 may be configured to operate the drive unit 120 in the high-speed mode. Such a signal may be referred to as a high-speed signal. A high-speed signal may comprise any suitable indication that the motor 100 should operate in a high-speed mode. For example, a high-speed signal may comprise a DC signal (whether continuous logic level, a single pulse of a logic level, and the like), an AC signal, a light pulse in a fiber optic cable, and the like. In one embodiment, the high-speed signal comprises a 24V AC signal. A high-speed mode may comprise the drive unit 120 operating at the fastest possible speed, at the maximum drive current amperage, voltage, and/or frequency in view of the electric power received by the electric power input, and the like. A high-speed mode may comprise the drive unit 120 operating at a predetermined (but not necessarily fastest) speed. The predetermined speed may be preset, fixed, user-settable, or otherwise determined, and may be limited to a range including a minimum and maximum speed. A high-speed mode may include the drive unit 120 ramping-up to and/or ramping-down from the fastest or otherwise predetermined speed.

The motor electronics assembly 140 may comprise a connector to receive the high-speed signal. The connector may comprise any system configured to electrically and/or communicatively couple with a conductor (electrical or otherwise) capable of delivering the high-speed signal. Such a connector may be referred to as a high-speed signal input, and such a conductor may be referred to as a high-speed signal conductor. The motor regulation inputs may comprise the high-speed signal input. In one embodiment, the high-speed signal input may comprise any system configured to electrically couple with an electrical conductor capable of delivering the high-speed signal. The high-speed signal input may comprise any suitable electrically conductive material. For example, the high-speed signal input may comprise any suitable screw terminal, wire connector, wire nut, terminal capable of being soldered, and the like. In one embodiment, the motor electronics assembly 140 comprises a plurality of high-speed signal inputs, for example to facilitate coupling with a plurality of high-speed signal conductors. The motor electronics assembly 140 may be configured to operate the motor 100 in a high-speed mode when a high-speed signal is received on any of the high-speed signal inputs.

Figure 17:
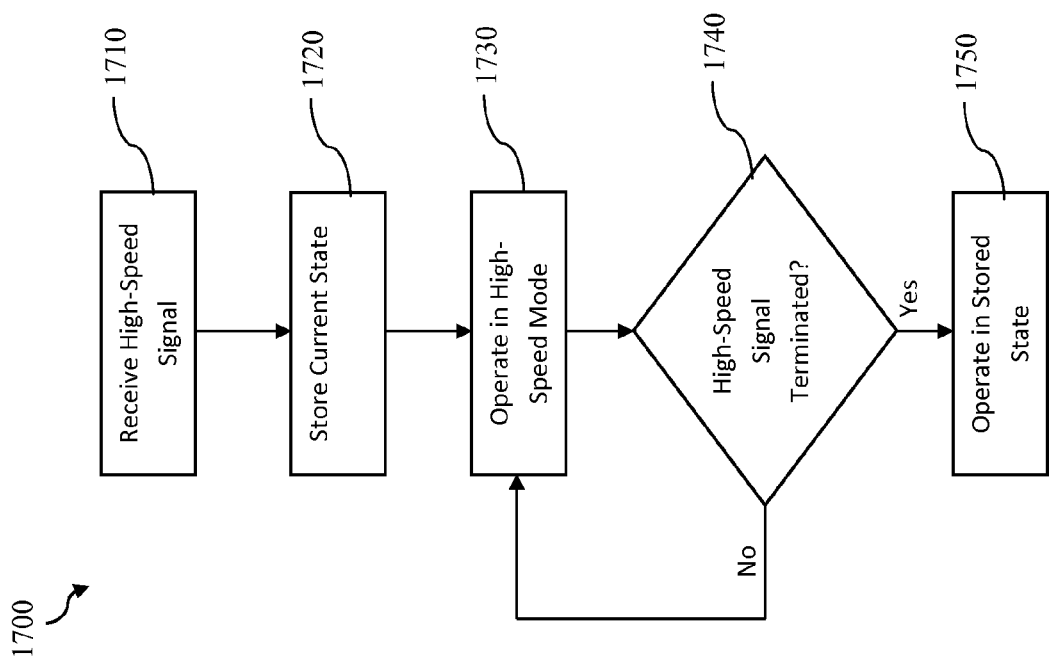
FIG. 17 is a flow chart for operating in a high-speed mode in accordance with an exemplary embodiment of the present invention.

Referring to FIG. 17, the motor electronics assembly 140 may be configured to operate the motor 100 in a high-speed mode (1730) as long as the high-speed signal is being received (1710) by any of the high-speed signal inputs, and may be configured to operate the motor 100 according to the operating program and/or the motor regulation input (for example, the electric power input and/or the control signal input) when none of the high-speed signal inputs are receiving the high-speed signal.

The motor electronics assembly 140 may be configured to store the current operating state of the motor 100 (1720) upon receiving the high-speed signal (1710) on any of the high-speed signal inputs, operate the motor 100 in a high-speed mode (1730) as long as (1740) the high-speed signal is being received, and return the motor 100 to the stored operating state (1750) when (1740) the high-speed signal is terminated. The high-speed signal may be considered terminated when none of the high-speed signal inputs are receiving the high-speed signal.

The current operating state may be stored (1720) in any suitable manner and in any suitable memory device. In one embodiment, the motor electronics assembly 140 may store (1720) the current operating state in a plurality of bits in a random access memory when a high-speed signal is received, may operate the motor 100 in a high-speed mode (1730) while the high-speed signal continues to be received (1710), and may operate the motor 100 according to the stored plurality of bits (1750) when (1740) the high-speed signal is terminated. In another embodiment, the motor electronics assembly 140 may pause a currently-executing operating program and/or may store a reference to the portion of an operating program that is currently being executed when a high-speed signal is initially received (1710), may operate the motor in a high-speed mode (1730) while (1740) the high-speed signal continues to be received, and may continue the operating program when the high-speed signal is terminated by un-pausing the operating program and/or executing the operating program from the referenced portion.

For example, for a motor 100 operating in an aquatic pumping environment having panels designed to heat water via solar radiation, the panels or a control system electrically coupled with the panels may generate a signal indicating water should be routed to the panels for heating when a sufficient amount of sunlight is detected. This signal is typically delivered to an actuator to direct a flow of water to the panels. The signal may also be delivered to the motor electronics assembly 140. The motor 100 may then operate in high-speed mode in response to the signal, thereby facilitating the delivery of water to the panels, which are sometimes installed at an elevated position. When the signal to the actuator is terminated, the signal delivered to the motor electronics assembly will also be terminated and the motor 100 may then return to normal operation, for example by operating according to the currently executing operating program and/or the current motor regulation inputs, or by returning the motor 100 to the stored operating state.

The motor electronics assembly 140 may comprise any suitable system or method for causing the motor 100 to operate in a high-speed mode in response to receiving the high-speed signal. For example, the motor electronics assembly 140 may rectify an AC high-speed signal so that it can be used as a DC control input to the motor electronics assembly 140, for example for use by the power electronics assembly and/or the control electronics assembly. Furthering the example, the motor electronics assembly 140 may use the rectified high-speed signal to control an electronic switch (such as a transistor or a relay), may pass the rectified high-speed signal through a DC-DC converter, and the like, to provide a signal at an appropriate voltage for use by the motor electronics assembly 140. The power electronics assembly and/or the control electronics assembly may therefore be configured to operate the drive unit 120 in the high-speed mode in response to the converted high-speed signal.

Figure 14:
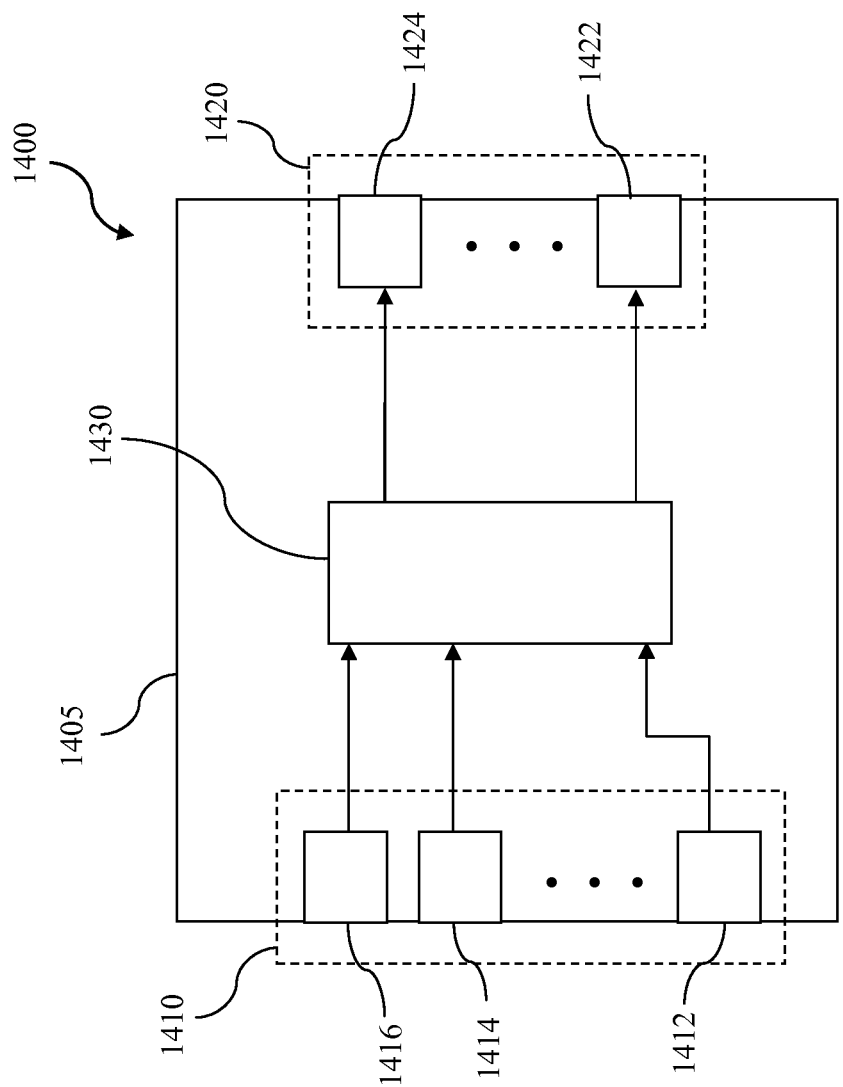
FIG. 14 representatively illustrates a high-speed motor controller in accordance with an exemplary embodiment of the present invention.

In an alternative embodiment, and referring to FIG. 14, a high-speed motor controller 1400 may perform the functions of causing the motor 100 to operate in a high-speed mode in response to the high-speed signal. The high-speed motor controller 1400 may be independent of the motor 100 and may be configured to electrically and/or communicatively couple with the motor 100. The high-speed motor controller 1400 may be used in conjunction with any suitable motor 100. The high-speed motor controller 1400 may comprise one or more high-speed signal inputs 1416 and one or more other motor regulation inputs 1412, 1414 (collectively, 1410), along with one or more motor regulation outputs 1422, 1424 (collectively, 1420). The motor regulation inputs 1410 may be configured to receive one or more motor regulation signals for the electric motor and the motor regulation outputs 1420 may be configured to transmit motor regulation signals for use by the electric motor 100. The motor regulation outputs 1420 may comprise one or more electric power outputs configured to transmit an electric power and/or one or more control signal outputs configured to transmit a control signal.

The high-speed motor controller 1400 may be configured to determine one or more motor regulation signals that will cause the motor 100 to operate in a high-speed mode, and may be configured to transmit the determined motor regulation signals on the motor regulation outputs 1420 while a high-speed signal is being received by any of the high-speed signal inputs 1416. The high-speed motor controller 1400 may be configured to operate the electric motor 100 according to the motor regulation inputs 1410 when none of the high-speed signal inputs 1416 are receiving the high-speed signal. For example, the high-speed motor controller 1400 may transmit, on the motor regulation outputs 1420, motor regulation signals substantially similar to the motor regulation signals received by the motor regulation inputs 1410 (excepting, in one embodiment, motor regulation signals substantially similar to the motor regulation signals received by the one or more high-speed signal inputs 1416). The motor 100 may therefore operate as if no high-speed motor controller is present when the high-speed signal is not being received by any of the high-speed signal inputs 1416.

For example, the high-speed motor controller 1400 may be electrically coupled with a first off-the-shelf electric motor. The first off-the-shelf electric motor may be configured to accept multiple electric power inputs, each adapted to operate the first off-the-shelf electric motor at a different speed. The high-speed motor controller 1400 may be configured to receive, via the motor regulation inputs 1410, the multiple electric power inputs and to transmit the multiple electric power inputs substantially unaltered, via the motor regulation outputs 1420, to the first off-the-shelf electric motor when a high-speed signal is not being received by the high-speed signal input 1416. The high-speed motor controller 1400 may select the electric power input corresponding to the highest (or otherwise desired) speed, or may select any active electric power input if each electric power input receives the same electric power. Upon receiving a high-speed signal on the high-speed signal input, the high-speed motor controller 1400 may transmit the selected electric power input on the motor regulation output 1420 coupled with the electric power input of the first off-the-shelf motor corresponding to the highest (or otherwise desired) speed. The first off-the-shelf electric motor may therefore receive the appropriate electric power inputs to operate the first off-the-shelf electric motor at the predetermine speed when the high-speed signal is received by the high-speed motor controller 1400.

For further example, the high-speed motor controller 1400 may be electrically and/or communicatively coupled with a second off-the-shelf electric motor. The second off-the-shelf electric motor may comprise a single electric power input and may be configured to vary the speed of the second off-the-shelf electric motor according to control signals received by one or more control signal inputs. The high-speed motor controller 1400 may be configured to receive the one or more control signals by the motor regulation inputs 1410. The high-speed motor controller may also be configured to transmit substantially similar control signals, via the motor regulation outputs 1420, to the second off-the-shelf electric motor when a high-speed signal is not being received by the high-speed signal input. The high-speed motor controller 1400 may generate a control signal configured to cause the second off-the-shelf electric motor to operate at the highest (or otherwise desired) speed, and upon receiving a high-speed signal, the high-speed motor controller 1400 may transmit the generated control signal via the motor regulation outputs 1420. The second off-the-shelf electric motor may therefore receive a control signal that causes the second off-the-shelf electric motor to operate at the predetermined speed when the high-speed signal is received by the high-speed motor controller 1400.

In one embodiment, the high-speed motor controller 1400 may comprise a signal control module 1430. The signal control module 1430 may comprise any suitable system or method for performing the functions of determining the one or more motor regulation signals that will cause the motor 100 to operate in the high-speed mode, and choosing, for example based on the high-speed signal input, whether to transmit the determined motor regulation signals or the motor regulation signals substantially similar to those received by the one or more motor regulation inputs 1410.

Figure 15B:
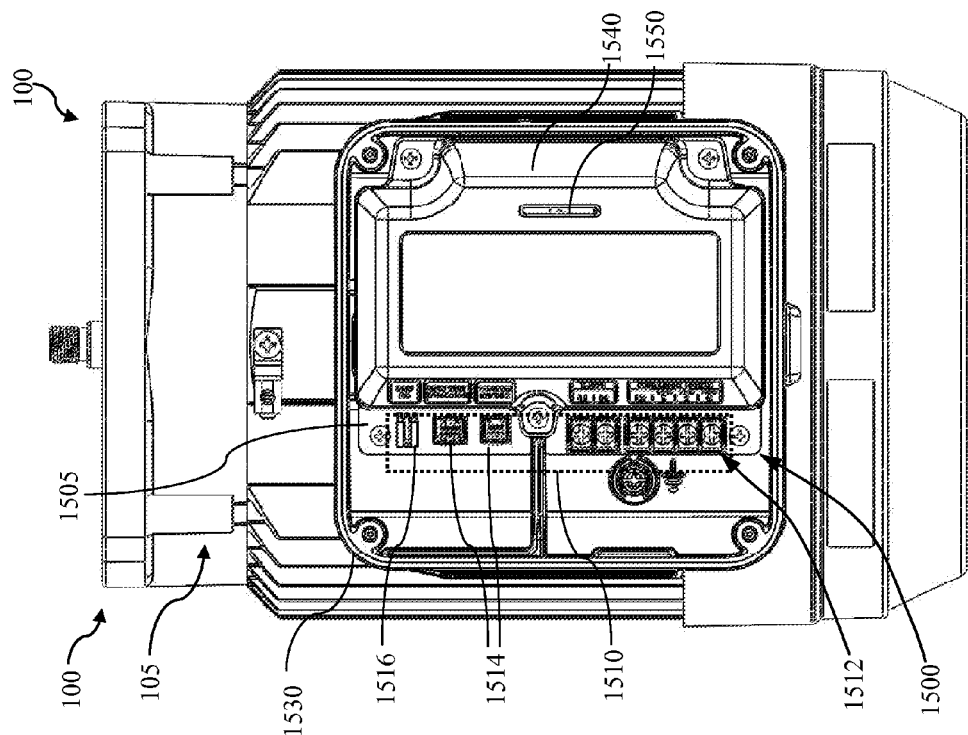
FIG. 15B is a top-down view of the motor with the connection box and a customer connection board in accordance with an exemplary embodiment of the present invention.
Figure 15A:
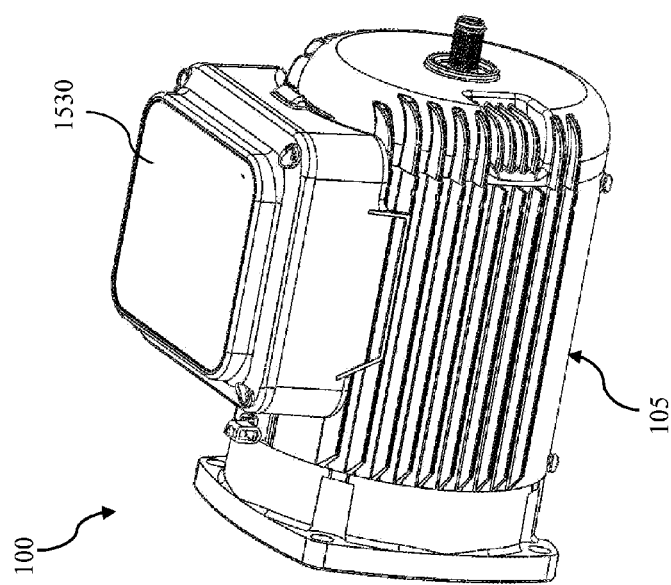
FIG. 15A is a perspective view of the motor with a connection box in accordance with an exemplary embodiment of the present invention.

Referring now to FIGS. 15A and 15B, the motor electronics assembly 140 may comprise a customer connection board 1500 providing a single location for receiving each motor regulation signal according to which the motor electronics assembly 140 is configured to operate. The customer connection board 1500 may comprise any suitable arrangement of motor regulation inputs 1510 that allows all motor regulation inputs 1510 to be physically accessed from the same location. The customer connection board 1500 may create a protected access point for a user, away from other high voltage and possibly hazardous circuitry. The motor regulation inputs 1510 may comprise one or more high-speed signal inputs 1516, one or more control signal inputs 1514, and/or one or more electric power inputs 1512. The motor regulation inputs 1510 may provide a state of the motor 100.

In one embodiment, the customer connection board 1500 may comprise the motor regulation inputs 1510 mounted on a single printed circuit board 1505. The customer connection board 1500 may be mounted to the inside of a connection box 1530 mounted to or otherwise part of the motor 100. The connection box 1530 may comprise any suitable housing for providing a connection point for one or more of the motor regulation inputs 1510. In an alternative embodiment, the customer connection board 1500 may comprise the motor regulation inputs 1510 mounted on a plurality of printed circuit boards located proximal to each other in or on the motor 100. In yet another embodiment, the customer connection board 1500 may comprise the motor regulation inputs 1510 mounted to the motor, for example to the motor shell 105 or to the inside of the connection box 1530, and mounted proximal to each other.

The motor 100 may comprise a customer connection board cover 1540. The customer connection board cover 1540 may comprise any suitable system or method for providing additional protection to a user and/or the electronic components and wiring by covering substantially the entire non-motor regulation input portion of the customer connection board 1500. The non-motor regulation input portion of the customer connection board 1500 may comprise all areas of the customer connection board containing electronic components and/or wiring, excluding the motor regulation inputs. Covering substantially the entire non-motor regulation input portion may comprise covering enough of the non-motor regulation input portion to reduce the likelihood of undesired contact of foreign objects with the customer connection board 1500. For example, the customer connection board cover 1540 may prevent a user from accidently touching any of the electronic components and/or wiring of the customer connection board 1500, except for the motor regulation inputs.

The customer connection board cover 1540 may be selectively positionable with respect to the customer connection board 1500. Selectively positioning the customer connection board cover 1540 may comprise securing the customer connection board cover 1540 in place in a manner that it can be subsequently removed and secured in place again. In one embodiment, the customer connection board cover 1540 may be secured in placed to the customer connection board 1500, for example to the printed circuit board 1505. In another embodiment, the customer connection board cover 1540 may be secured in place to the connection box 1530. Selective positioning may be provided by any suitable system or method for impermanently securing the customer connection board cover 1540 in place. For example, the customer connection board cover 1540 may be selectively positioned using screws, clips, tabs, tape, and the like.

The customer connection board cover 1540 may be pivotally attached to the motor 100 such as by a hinge. In one embodiment, the customer connection board cover 1540 is hinged to the customer connection board 1500. The hinge may comprise any suitable system for allowing the customer connection board cover 1540 to pivot. For example, the customer connection board cover 1540 may comprise a slot or hole 1550, and the hinge may comprise one or more wires from the motor electronics assembly 140 passing through the slot or hole 1550.

Figure 16:
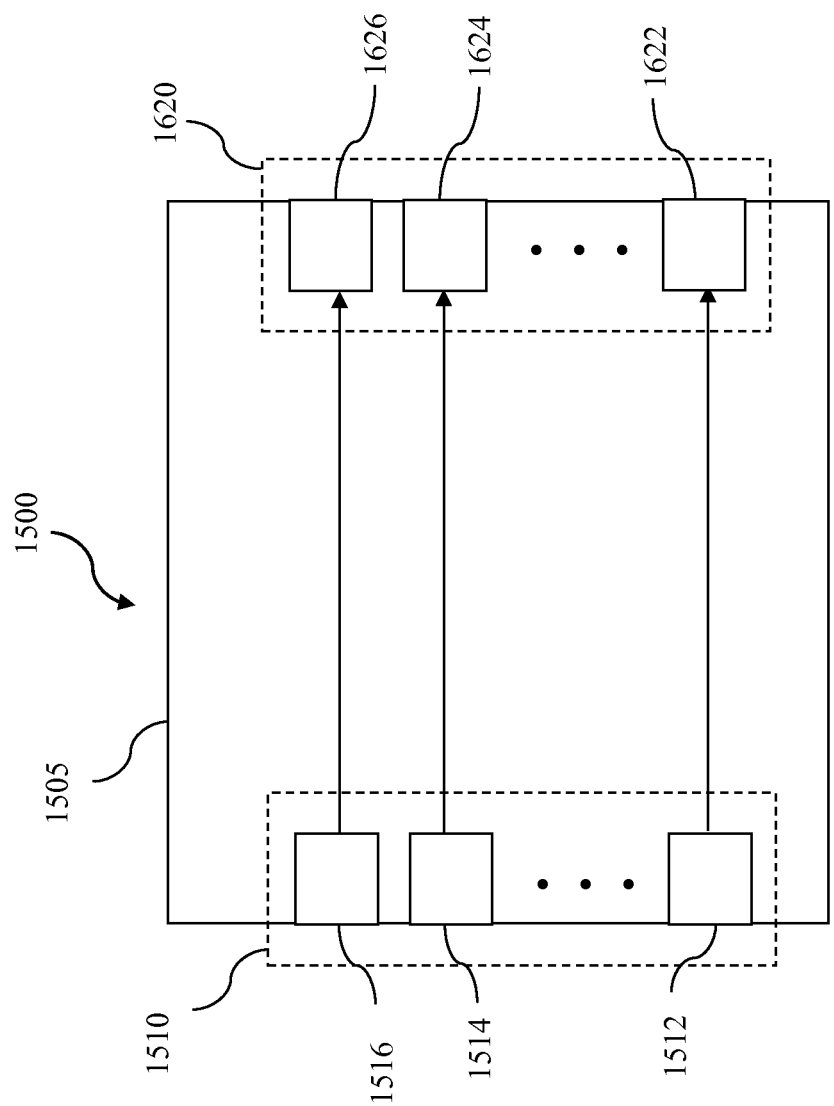
FIG. 16 representatively illustrates the standalone customer connection board in accordance with an exemplary embodiment of the present invention.

In an alternative embodiment, and referring to FIG. 16, the customer connection board 1500 may be independent of the motor 100 and may be configured to electrically and/or communicatively couple with the motor 100. In this embodiment, the customer connection board 1500 may be used in conjunction with any suitable motor 100, may provide a single location for receiving each motor regulation signal according to which the motor 100 is configured to operate, and may transmit each received motor regulation signal for the motor 100. In this embodiment, the customer connection board 1500 may comprise one or more motor regulation inputs 1510 electrically and/or communicatively coupled with one or more corresponding motor regulation outputs 1620. The motor regulation inputs 1510 may comprise a high-speed signal input 1516 and the motor regulation outputs 1620 may comprise a high-speed signal output 1626, wherein the high-speed signal input 1516 is electrically and/or communicatively coupled with the high-speed signal output 1626. The high-speed signal output 1626 may comprise a connector to transmit a high-speed signal. The connector may comprise any system configured to electrically and/or communicatively couple with a conductor (electrical or otherwise) capable of delivering the high-speed signal.

The motor 100 may comprise a user interface. The user interface provides the ability to control the present and/or future operation of the motor 100. For example, the user interface may facilitate control of the speed of the drive unit 120, duration of operation of the drive unit 120, creating, editing, and running an operating program, and the like. The user interface may comprise a user interface surface and one or more input receptors configured to receive an input. The one or more input receptors may be electrically coupled with the motor electronics assembly 140 and may be positioned to receive input through the user interface surface. The motor electronics assembly 140 may be configured to operate the drive unit 120 according to the input received by the one or more input receptors.

In one embodiment, the input receptors may indicate a general speed (e.g. low, medium-low, medium-high, high, and the like), according to which the motor electronics assembly 140 may operate the drive unit 120 at the associated predetermined speed (whether a fixed, user-settable, or otherwise determined speed). The input receptors may indicate an increase or decrease in the speed and/or time the motor 100 should operate, and the motor electronics assembly 140 may adjust the operation of the drive unit 120 accordingly, for example in increments of 50 revolutions per minute ("RPM") or 15 minutes, respectively. The input receptors may further provide input to the motor electronics assembly 140 corresponding to manual and/or emergency starting and/or stopping of the motor 100, menu selection, locking, and the like.

The user interface and the motor electronics assembly 140 may facilitate setting the speed of the drive unit 120 (for example in units of RPM) associated with a general speed (for example low, medium-low, medium-high, high, and the like). The user interface and the motor electronics assembly 140 may facilitate the creation and/or modification of an operating program. The motor electronics assembly 140 may constrain each settable operating parameter to a fixed minimum and maximum safe operating range for the motor 100.

The one or more input receptors may comprise non-mechanical input receptors. A non-mechanical input receptor may be defined as an input receptor that does not require physical motion of the sensor to receive or otherwise detect input. A non-mechanical input receptor may comprise a capacitive sensor, infrared sensor, antenna, and the like. In one embodiment, the one or more input receptors comprise capacitive sensors, and the one or more input receptors may be positioned adjacent to the user interface surface to receive input, such as the touch of a human body part or a stylus, through the user interface surface. In another embodiment, the one or more input receptors comprise infrared sensors, and the one or more input receptors may be positioned adjacent to the user interface surface to transmit and/or receive infrared light through the user interface surface to detect when an object, such as a human finger, is placed in front of the one or more input receptors. In this embodiment, a portion of the user interface surface proximal to the one or more input receptors may be transparent to allow for transmission of the infrared light.

In yet another embodiment, the one or more input receptors may comprise an antenna, and the motor electronics assembly 140 may comprise a radio receiver. The motor electronics assembly 140 may also comprise a radio transmitter. The motor electronics assembly 140 may be configured to receive communication via the antenna using any suitable wireless communication protocol, such as ZigBee (e.g. IEEE 802.15.4), Wi-Fi (e.g. IEEE 802.11), Bluetooth, and the like. The motor electronics assembly 140 may be configured to transmit communication via the antenna using any suitable wireless communication protocol.

The user interface may also provide notification of the present state of the motor 100. In one embodiment, the user interface may comprise one or more indicators electrically coupled with the motor electronics assembly 140. An indicator may comprise any suitable system or method for emitting light or sound, for example a light-emitting device ("LED"), a speaker, and the like, and the motor electronics assembly 140 may be configured to transmit information corresponding to the state of the motor 100 via the one or more indicators. In another embodiment, the user interface may comprise an antenna, and the motor electronics assembly 140 may be configured to transmit information corresponding to the state of the motor 100 via the antenna using any suitable wireless communication protocol, such as ZigBee, Wi-Fi, Bluetooth, and the like.

In one embodiment, the user interface comprises one or more input receptors mounted on a printed circuit board, for example a rigid fiberglass/epoxy substrate such as FR-4, and the user interface surface is mounted on the printed circuit board. The user interface surface may provide a barrier between the external environment in which the motor 100 is located and one or more input receptors. The user interface surface may comprise any suitable material and/or coating for protecting the one or more input receptors from the external environment. The user interface surface may comprise plastic, glass, metal, and the like. The user interface surface may be UV resistant, impact resistant, and/or weather resistant. In one embodiment, the user interface surface comprises a polycarbonate top surface, and the user interface surface may be mounted to the printed circuit board using a foam spacer. In embodiments comprising one or more LEDs, the user interface surface may further comprise one or more progressive lensing light-spreading segments. The connection box 1530 may comprise the user interface surface. In one embodiment, a lid for the connection box 1530 comprises the user interface surface, and the lid in combination with the connection box 1530 protects at least some of the motor electronics assembly 140.

The motor electronics assembly 140 may be configured to become unresponsive to the user interface if a lock indication is received by the user interface. A lock indication may comprise any suitable input received by the user interface indicating that the motor 100 should become unresponsive to the user interface. In one embodiment, the user interface comprises an input receptor dedicated to receiving a lock indication, for example a lock button. In an alternative embodiment, the lock indication may comprise a predefined sequence (whether a preset, fixed, user-settable, or otherwise determined sequence) of input receptors receiving input, for example requiring a user to activate a combination of input receptors. In yet another embodiment, the lock indication may comprise a predefined sequence of input receptors receiving input while a lock button simultaneously receives input. Upon observing that the user interface received the lock indication, the motor electronics assembly 140 may become unresponsive to inputs received by the user interface. When the motor electronics assembly 140 is unresponsive to the user interface, the motor electronics assembly may ignore inputs received by the user interface for the purposes of controlling the motor 100 but may pay attention to inputs received by the user interface for the purpose of determining if an unlock indication is received.

The motor electronics assembly 140 may become responsive to the user interface if an unlock indication is received by the user interface. An unlock indication may comprise any suitable input received by the user interface indicating that the motor 100 should become responsive to the user interface. In one embodiment, the user interface comprises an input receptor dedicated to receiving a unlock indication, for example the lock button or an unlock button. In an alternative embodiment, the unlock indication may comprise a predefined sequence (whether a preset, fixed, user-settable, or otherwise determined sequence) of input receptors receiving input, for example requiring a user to activate a combination of input receptors. In yet another embodiment, the unlock indication may comprise a predefined sequence of input receptors receiving input while a lock or unlock button simultaneously receives input. Upon observing that the user interface received the unlock indication, the motor electronics assembly 140 may become responsive to inputs received by the user interface.

The electrical couplings described herein may comprise any electrically conductive material, or any combination of electrically conductive materials. In addition, electrical coupling may be accomplished directly, for example using only electrically conductive materials, or indirectly, for example through one or more intermediary electronic components. The communicative couplings described herein may provide one-way, two-way, and/or multi-way communication, and communication may comprise the one-way, two-way, and/or multi-way transfer of information and/or other data. The communicative couplings described herein may comprise electrical couplings, wireless couplings, and the like. Further, the electrical couplings described herein relating to control signals may comprise wireless couplings. Wireless couplings may use any suitable wireless communication protocol, such as ZigBee (e.g. IEEE 802.15.4), Wi-Fi (e.g. IEEE 802.11), Bluetooth, and the like.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing description, the invention has been described with reference to specific exemplary embodiments. Various modifications and changes may be made, however, without departing from the scope of the present invention as set forth. The description and figures are to be regarded in an illustrative manner, rather than a restrictive one and all such modifications are intended to be included within the scope of the present invention. Accordingly, the scope of the invention should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present invention and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The present invention has been described above with reference to an exemplary embodiment. However, changes and modifications may be made to the exemplary embodiment without departing from the scope of the present invention. These and other changes or modifications are intended to be included within the scope of the present invention.

The invention claimed is:

1. An electric motor, comprising:
   a motor shell, comprising:
   a first end;
   a second end;
   a sidewall portion extending between the first and second ends and forming an interior volume between the first and second ends;
   a thermally conductive material;
   an exterior transition surface disposed between the second end and the sidewall portion of the motor shell, wherein the transition surface is defined by an elliptical curve;
   a first heat fin projecting outward from and extending along the sidewall portion of the motor shell at least part way between the first and second ends; and
   a second heat fin projecting outward from and extending along the exterior transition surface between the sidewall portion and the second end of the motor shell, wherein the second heat fin describes a second elliptical curve connecting an edge of the first heat fin to the second end of the motor shell;

a drive unit disposed within the interior of the motor shell, comprising:
  a stator positioned proximate to the first end of the motor shell and comprising a substantially circular stator core; and;
  a substantially circular rotor positioned parallel and proximate to the stator, wherein the center of the stator core and the center of the rotor are axially aligned;

a shaft coupled to the drive unit, wherein:
  a first end of the shaft extends outward from the interior of the motor shell through a first hole in the first end of the motor shell; and
  the shaft is coupled to the rotor;

a motor electronics assembly electrically coupled with the drive unit and configured to operate the drive unit, wherein the motor electronics assembly comprises an embedded electronics assembly contained within the motor shell and located proximate to the second end of the motor shell;

a fan guard coupled to the motor shell to for a cavity defined by at least partially by an interior surface of the fan guard and an exterior surface of the second end of the motor shell, wherein the interior surface of the fan guard describes an elliptical curve extending from a side portion of the fan guard to an end portion of the fan guard;

a first fan assembly coupled to a second end of the shaft disposed within the cavity; and a second fan assembly coupled to the shaft and enclosed within the motor shell, wherein the second fan assembly is positioned to cause a movement of air adjacent to the embedded electronics assembly when the second fan assembly is rotated.

2. An electric motor according to claim 1, wherein:
the stator comprises at least two electromagnetic coils; and
the rotor comprises at least two magnetic field sources, wherein each magnetic field source is oriented in a direction of opposite magnetic polarity to a neighboring magnetic field source.

3. An electric motor according to claim 2, wherein:
the stator core comprises at least two teeth positioned circularly about the center of the stator core, wherein each of the at least two teeth comprises a ferromagnetic material;
each of the at least two electromagnetic coils is positioned around one of the at least two teeth;
the rotor comprises a backing plate;
each of the at least two rotor magnetic field sources are coupled to the backing plate; and
each of the at least two rotor magnetic field sources comprise a permanent magnet.

4. An electric motor according to claim 3, wherein:
the stator comprises an identical number of electromagnetic coils and stator core teeth, and each of the at least two stator core teeth is positioned within exactly one of the at least two electromagnetic coils.

5. An electric motor according to claim 4, wherein:
the stator comprises 24 electromagnetic coils positioned circularly about the center of the stator core;
the stator core comprises 24 teeth positioned circularly about the center of the stator core; and the rotor comprises 20 magnetic field sources positioned circularly about the center of the rotor.

6. An electric motor according to claim 3, wherein:
each of the at least two rotor magnetic field sources comprises at least one of a dysprosium-infused neodymium magnet and a samarium cobalt magnet.

7. An electric motor according to claim 3, wherein:
each of the rotor magnetic field sources comprises a first side, a second side, a third side, and a fourth side, wherein:
  the first side is defined by a first circle having a first radius and the second side is defined by a second circle having a second radius, wherein:
    the first circle is concentric with the second circle; and
    the center of the first circle and the second circle defines a first reference point;
  the third side is defined by a first line and the fourth side is defined by a second line, wherein:
    the intersection of the first line and the second line defines a second reference point; and
    the first line and the second line define a first angle; and
  the second reference point is offset from the first reference point.

8. An electric motor according to claim 7, wherein:
the first radius is approximately 41 mm;
the second radius is approximately 68 mm;
the first angle is approximately 13.46 degrees;
the second reference point is offset from the first reference point vertically by approximately 0.634 mm; and
the second reference point is offset from the first reference point horizontally by approximately 5.37 mm.

9. An electric motor according to claim 8, wherein the rotor magnetic field source is approximately 4 mm thick.

10. An electric motor according to claim 2, wherein:
each of the electromagnetic coils comprises an insulated copper wire.

11. An electric motor according to claim 1, further comprising a labyrinth seal coupled between the shaft and the first hole.

12. An electric motor according to claim 11, wherein the labyrinth seal comprises a wash-down grade seal.

13. An electric motor according to claim 1, further comprising:
a fan guard coupled to the motor shell to form a cavity defined at least partially by an interior surface of the fan guard and an exterior surface of the second end of the motor shell; and
a first fan assembly coupled to a second end of the shaft disposed within the cavity.

14. An electric motor according to claim 13, wherein the first fan assembly comprises:
a hub configured to couple the first fan assembly to the shaft, wherein the hub comprises:
  a first end disposed adjacent to the exterior surface of the second end of the motor shell; and
  a second end disposed proximate the end of the shaft;
a plurality of fan blades extending radially outward from the hub; and
an air guide disposed between a first and second fan blade, wherein the air guide is defined by an elliptical surface extending at least part way between the first and second ends of the hub.

15. An electric motor according to claim 14, wherein a leading edge of each of the plurality of fan blades is defined by an elliptical surface extending from the hub to an end portion of the fan blade.

16. An electric motor according to claim 14, wherein the air guide is defined by two elliptical surfaces that are tangent at their intersection.

17. An electric motor according to claim 14, wherein:
the motor shell further comprises an exterior transition surface disposed between the second end and the sidewall portion of the motor shell, wherein the transition surface is defined by a substantially concave surface extending into the motor shell; and
the air guide extends from the hub to a position approximately adjacent to an intersection of the second end and the exterior transition surface.

18. An electric motor according to claim 13, wherein the interior surface of the fan guard describes an elliptical curve extending from a side portion of the fan guard to an end portion of the fan guard.

19. An electric motor according to claim 13, wherein:
the motor shell further comprises an exterior transition surface disposed between the second end and the sidewall portion of the motor shell, wherein the transition surface is defined by an elliptical curve.

20. An electric motor according to claim 19, wherein:
the motor shell further comprises a first heat fin projecting outward from and extending along the sidewall portion of the motor shell at least part way between the first and second ends.

21. An electric motor according to claim 20, wherein:
the motor shell further comprises a second heat fin projecting outward from and extending along the exterior transition surface between the sidewall portion and the second end of the motor shell, wherein the second heat fin describes a second elliptical curve connecting an edge of the first heat fin to the second end of the motor shell.

22. An electric motor according to claim 13, wherein:
the motor shell further comprises an exterior transition surface disposed between the second end and the sidewall portion of the motor shell, wherein the transition surface is defined by a substantially concave surface extending into the motor shell.

23. An electric motor according to claim 22, wherein:
the motor shell further comprises a heat fin projecting outward from and extending along exterior transition surface, wherein an edge of the heat fin defines a substantially convex surface relative to the substantially concave surface of the exterior transition surface.

24. An electric motor according to claim 1, wherein:
the motor electronics assembly comprises an embedded electronics assembly contained within the motor shell.

25. An electric motor according to claim 24, wherein the embedded electronics assembly comprises:
a power electronics assembly configured to generate one or more drive currents; and
a control electronics assembly configured to control the power electronics assembly.

26. An electric motor according to claim 25, wherein:
the control electronics assembly is configured to control the power electronics assembly according to a profile.

27. An electric motor according to claim 25, wherein:
the control electronics assembly is proximate to the second end of the motor shell.

28. An electric motor according to claim 24, further comprising:
a second fan assembly coupled to the shaft, wherein:
the second fan assembly is enclosed within the motor shell; and
the second fan assembly is positioned to cause a movement of air adjacent to the embedded electronics assembly when the second fan assembly is rotated.

29. An electric motor according to claim 24, wherein:
the embedded electronics assembly is proximate to the second end of the motor shell.

30. An electric motor according to claim 1, wherein:
the electric motor can operate more than temporarily in an ambient temperature of 60 degrees Celsius;
the electric motor can provide 2.8 horsepower;
the motor shell has an internal diameter of 6.5 inches or less; and
the motor shell has a length of 12 inches or less.

* * * * *